United States Patent
Orlov

(10) Patent No.: US 10,948,042 B2
(45) Date of Patent: Mar. 16, 2021

(54) SHOCK AND VIBRATION ISOLATOR/ABSORBER/SUSPENSION/MOUNT UTILIZING AS A RESILIENT ELEMENT A CLOSED LOOP RESILIENT ELEMENT

(71) Applicant: Evgeny Orlov, Syracuse, NY (US)

(72) Inventor: Evgeny Orlov, Syracuse, NY (US)

( * ) Notice: Subject to any disclaimer, the term of this patent is extended or adjusted under 35 U.S.C. 154(b) by 0 days.

(21) Appl. No.: 16/421,800

(22) Filed: May 24, 2019

(65) Prior Publication Data
US 2020/0332852 A1    Oct. 22, 2020

Related U.S. Application Data

(60) Provisional application No. 62/836,212, filed on Apr. 19, 2019.

(51) Int. Cl.
| | |
|---|---|
| F16F 1/371 | (2006.01) |
| F16F 1/34 | (2006.01) |
| F16F 3/12 | (2006.01) |
| A42B 3/06 | (2006.01) |
| F16F 3/04 | (2006.01) |
| F16F 1/04 | (2006.01) |

(52) U.S. Cl.
CPC .............. *F16F 1/34* (2013.01); *A42B 3/06* (2013.01); *F16F 3/04* (2013.01); *F16F 3/12* (2013.01); *F16F 1/045* (2013.01); *F16F 2232/08* (2013.01)

(58) Field of Classification Search
CPC .... F16F 1/043; F16F 1/045; F16F 1/40; F16F 1/371; F16F 7/08; F16F 9/08; F16F 9/30
USPC .... 267/3, 4, 6, 33, 133, 134, 135, 136, 151, 267/152, 153, 167, 196, 201–207, 209, 267/210, 214
See application file for complete search history.

(56) References Cited

U.S. PATENT DOCUMENTS

| | | | | |
|---|---|---|---|---|
| 1,325,092 A | * | 12/1919 | Henshaw | F16F 1/045 267/167 |
| 1,772,414 A | * | 8/1930 | Brooke-Hunt | F16F 1/371 267/293 |
| 1,937,511 A | * | 12/1933 | Crane | F16F 9/0427 267/64.11 |
| 2,667,277 A | * | 1/1954 | Mulcahy | B61G 9/10 213/32 R |
| 2,710,750 A | * | 6/1955 | Blattner | F16F 7/08 267/214 |
| 3,424,448 A | * | 1/1969 | Chak Ma | F16F 9/30 267/35 |
| 3,515,382 A | * | 6/1970 | Gallagher | F16F 1/40 267/152 |

(Continued)

*Primary Examiner* — Christopher P Schwartz
(74) *Attorney, Agent, or Firm* — Bond, Schoeneck & King, PLLC; Blaine Bettinger

(57) ABSTRACT

A shock or vibration absorption device, comprising: (1) a housing comprising a spring-guiding surface; (2) a piston positioned within the housing and comprising a spring-engagement surface, wherein the piston is configured to move relative to the housing in response to an applied force; and (3) a closed-loop resilient element positioned between the spring-engagement surface of the piston and the spring-guiding surface of the housing such that a ring axis of the resilient element is substantially parallel to a direction of the applied force; wherein the resilient element is configured to absorb kinetic energy as the piston moves relative to the housing in response to the applied force.

18 Claims, 22 Drawing Sheets

(56) References Cited

U.S. PATENT DOCUMENTS

| | | | | |
|---|---|---|---|---|
| 4,010,940 | A * | 3/1977 | Freyler | B60G 15/00 |
| | | | | 267/201 |
| 5,720,474 | A * | 2/1998 | Sugiyama | A61F 2/60 |
| | | | | 135/75 |
| 6,193,225 | B1 * | 2/2001 | Watanabe | F16F 1/043 |
| | | | | 267/167 |
| 6,499,570 | B2 * | 12/2002 | Chu | F16F 9/08 |
| | | | | 188/129 |
| 7,055,812 | B2 * | 6/2006 | Balsells | F16F 1/045 |
| | | | | 267/166 |
| 2002/0113352 | A1 * | 8/2002 | Edwards | A43B 13/182 |
| | | | | 267/166 |
| 2013/0340150 | A1 * | 12/2013 | Brantley | A42B 3/121 |
| | | | | 2/425 |
| 2014/0306387 | A1 * | 10/2014 | Kreuzweger | B61F 5/06 |
| | | | | 267/3 |
| 2017/0112220 | A1 * | 4/2017 | Suddaby | A42B 3/064 |

* cited by examiner

SHOCK AND VIBRATION ISOLATOR/ABSORBER/SUSPENSION/MOUNT UTILIZING AS A RESILIENT ELEMENT A CLOSED LOOP RESILIENT ELEMENT

CROSS-REFERENCE TO RELATED APPLICATIONS

This application claims priority to U.S. Provisional Patent Application Ser. No. 62/836,212 filed on Apr. 19, 2019, and entitled "Shock Absorber with Garter Spring," the entirety of which is incorporated herein by reference.

FIELD OF THE INVENTION

The present disclosure is directed generally to a device utilizing a resilient element for shock and vibration isolation, absorption, suspension, and/or mounting, useful for any industry or device where control of external shock and vibration is required.

BACKGROUND

Mechanical vibration and shock are present in varying degrees in virtually all locations where equipment and people function. The adverse effect of these disturbances can range from negligible to catastrophic depending on the severity of the disturbance and the sensitivity of the equipment. For that reason almost every piece of machinery with moving components or buildings in areas with seismic activates requires shock and vibration isolation in a form of a shock and vibration isolator/absorber/mount, involving some type of a resilient elastomeric component, such as, for example, a compression or extension spring which are common and versatile.

To achieve a desired isolation effect the spring typically must have a sufficient number of coils and therefore will be relatively long, along with sufficient sway space for the isolated unit to deflect under an external load without interfering with surrounding equipment or structures. Both requirements, along with high levels of velocity and acceleration associated with a shock event, often imposes significant ergonomic, structural, and layout challenges especially when machinery layouts are constrained by available space requirements.

Although there are conventional shock and vibration isolators, they have inherent weaknesses that the present invention resolves. For example, metal spring isolators are a common type of shock and vibration isolators. However, metal spring isolators require significant height to function properly, and have a large sway space. Additionally, the lack of damping in this type of isolator forces them to experience extremely violent resonances conditions, and thus these isolators typically require an additional damping mechanism.

Another common type of shock and vibration isolator is the elastomeric isolator. However, most elastomeric isolators cannot be constantly subjected to large strains. An isolator with a large static deflection may give satisfactory performance temporarily but tends to drift or creep excessively over a relatively short period of time. For example, elastomers should not be continuously strained more than 10 to 15% in compression, nor more than 25 to 50% in shear. This significantly limits isolator load capacity, especially for high shock related applications. Additionally, non-linear behavior of elastomeric isolators is not easy to predict or analyze, and elastomers have limited applications due to environmental concerns, as they degrade over time.

Accordingly, there is a continued need for compact shock and vibration isolators with adequate damping and adequate performance under continuous large strains, among other desirable qualities.

SUMMARY OF THE INVENTION

The embodiments described herein are directed to a device utilizing a closed loop resilient element, further also referred to as a spring, for shock and vibration isolation, absorption, suspension, and/or mounting. The device comprises a closed loop resilient element or a plurality of such elements, using compression and/or extension, surrounded by a spring guiding body in which the loop is formed is normal to the direction of an external load. The spring can be further in a contact with an internal floating piston. The spring is able to freely contract or extend radially in the loop plane and simultaneously move normal to the loop plane when under contact pressure applied to it by the spring guiding body and/or floating piston and generated by an external load, while returning to its original configuration by expending or contracting back when the external shock load is removed, thus bringing the spring guiding body and/or the floating piston to its unloaded configuration. The spring guiding body and the floating piston may optionally further have means for attachment to supporting structures such as upper and lower mounts such as a flange, clevis, threaded feature, brace, or other structure. A captive nut or flange may be utilized to provide a mechanical integrity of described device. A canted coil spring may be utilized, providing additional energy storing capabilities.

According to an embodiment is provided a shock or vibration absorption device, comprising: (1) a housing comprising a spring-guiding surface; (2) a piston positioned within the housing and comprising a spring-engagement surface, wherein the piston is configured to move relative to the housing in response to an applied force; and (3) a closed-loop resilient element positioned between the spring-engagement surface of the piston and the spring-guiding surface of the housing such that a ring axis of the resilient element is substantially parallel to a direction of the applied force; wherein the resilient element is configured to absorb kinetic energy as the piston moves relative to the housing in response to the applied force.

According to an embodiment, the spring-guiding surface is slanted.

According to an embodiment, the piston is fixed and the housing is configured to move relative to the piston in response to the applied force.

According to an embodiment, the housing is fixed and the piston is configured to move relative to the piston in response to the applied force.

According to an embodiment, the spring-engagement surface of the piston is curved or angled.

According to an embodiment, the housing comprises a mount configured to mount the device in a fixed position.

According to an embodiment, the piston comprises a mount.

According to an embodiment, the device further includes a captive nut comprising a center cavity formed therethrough via which the piston can move in response to the applied force.

According to an embodiment, the device further includes a dampening element.

According to an embodiment, the dampening element is an elastomeric dampening element.

According to an embodiment, the device further includes a second spring-guiding surface within the housing; a second piston configured to move relative to the housing in response to a second applied force, and comprising a second piston spring-engagement surface; and a second closed-loop resilient element, the second resilient element positioned between the second piston spring-engagement surface and the second spring-guiding surface.

According to an embodiment, the applied force and the second applied force are substantially opposing forces.

According to an embodiment, the device further includes a second spring-guiding surface within the housing; a second closed-loop resilient element; and a second piston spring-engagement surface of the piston; wherein the second resilient element is positioned between the second spring-guiding surface of the housing and the second piston spring-engagement surface of the piston.

According to an embodiment, the first and second spring-engagement surfaces are positioned on opposite sides of the piston.

According to a second aspect is a shock or vibration absorption device, comprising: (1) a housing comprising a first spring-guiding body with a first spring-guiding surface and a second spring-guiding body with a second spring-guiding surface, wherein at least one of the first and second spring-guiding body is configured to move relative to the other spring-guiding body in response to an applied force; (2) a first closed-loop resilient element positioned relative to the first spring-guiding surface that a ring axis of the first resilient element is substantially parallel to a direction of the applied force; and (3) a second closed-loop resilient element positioned relative to the second spring-guiding surface that a ring axis of the second resilient element is substantially parallel to a direction of the applied force; wherein each of the first and second resilient elements are configured to absorb kinetic energy as the at least one of the first and second spring-guiding bodies moves relative to the other spring-guiding body in response to an applied force.

According to an embodiment, the device further includes an internal component positioned between the first and second resilient elements, the internal component comprising a first spring-engagement surface configured to interact with the first resilient element and a second spring-engagement surface configured to interact with the second resilient element.

According to a third aspect is a helmet device, comprising: (1) a housing comprising a spring-guiding surface; (2) a piston positioned within the housing and comprising a spring-engagement surface; and (3) a closed-loop resilient element positioned between the spring-engagement surface of the piston and the spring-guiding surface of the housing such that a ring axis of the resilient element is substantially parallel to a direction of the applied force; wherein the resilient element is configured to absorb kinetic energy in response to the applied force.

These and other aspects of the invention will be apparent from reference to the embodiment(s) described hereinafter.

BRIEF DESCRIPTION OF THE DRAWINGS

In the drawings, like reference characters refer to the same parts throughout the different views, and the drawings are not necessarily to scale.

DETAILED DESCRIPTION OF EMBODIMENTS

The present disclosure describes a shock and vibration control device with a resilient element formed in a shape of closed loop contour and constructed such a way that it can expend or contract under external load applied normally to the loop plane when pushed against inclined surface tangent to the resilient element externally or internally, thus absorbing external energy. The device and spring also comprises the ability to freely return back to its original position when external load is removed, thus dissipating absorbed energy.

Due to the proposed spring layout the spring stores and dissipates energy within the plane normal to the external load application while its travel distance from an unimpacted configuration to an impacted configuration in the direction of the load application is significantly less than that for an equivalent straight spring, though absorbing the same amount of energy. It hence results in the significantly shorter deflection of the protected equipment in the direction of the external load isolation and consequently significantly smaller speed of the equipment, acceleration, and experienced external loads at the same frequency response. It further significantly minimizes the need for additional damping mechanism, and the shock absorber structure can be also made significantly shorter in the direction of the isolation along with less sway spacing required.

A "resilient element" is, for example, a closed-loop helical spring (such as a garter spring, canted coil spring, etc.) or a combination of resilient and/or ridged segments forming a closed-loop. According to different embodiments and depending on the design of the system or device, the resilient element may compress or extend (stretch) under a load absorbing energy. For example, a compression closed-loop spring may have spacing between the coils in the initial configuration, with the spacing decreasing under the load. Similarly, extension closed-loop springs do not have spacing between coils in the initial configuration, and the spacing is produced and grown under the load. According to one embodiment, the resilient element is in a shape of solid elastomeric O-ring, which behaves in a similar manner.

Figure 1A:
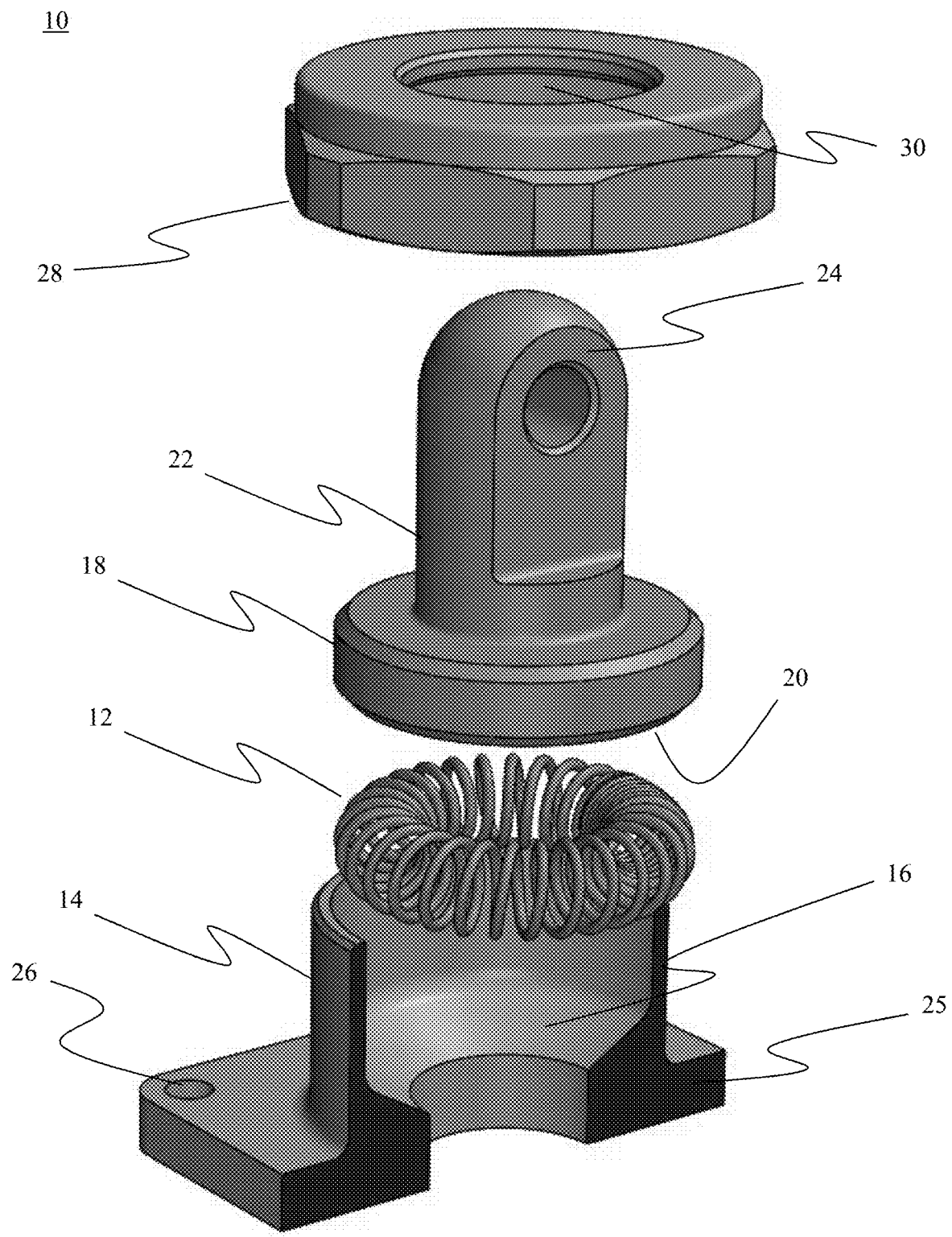
FIG. 1A is an exploded view schematic representation of a one-piston comprising spring device for shock absorption and/or isolation, in accordance with an embodiment.

Referring to FIG. 1A, in one embodiment, is an exploded view of a one-piston comprising spring device 10 for shock absorption and/or isolation. The device comprises a closed loop spring 12, sometimes called a garter spring, which can have a constant or variable pitch within device 10. Closed loop spring 12 is retained and positioned within a circular housing 14 comprising a spring-guiding surface 16 with a straight or curved profile. The circular housing 14 further comprises a base 25 with a lower mount 26, which may be any mechanism for attaching the housing to another component or element of a system. The base 25 may be circular, square, or any other shape.

The device further comprises a single piston 18 having an engagement surface 20 configured to engage and apply a force to the closed loop spring 12. The single piston 18 further comprises a piston rod 22 and an upper mount 24 configured to mount the rod to another component. The piston receives a variable force via upper mount 24 which causes the piston rod 22 to downward within the housing 14 to apply a force to the spring 12, against the spring's bias. When the force is absent or removed, the piston rod 22 is allowed to move upward within the housing 14 by the bias force of the spring 12. The piston is held in place by a captive nut 28, which comprises a center cavity 30 formed there through via which the piston rod can move up or down depending on the variable force imposed on the piston.

Figure 1B:
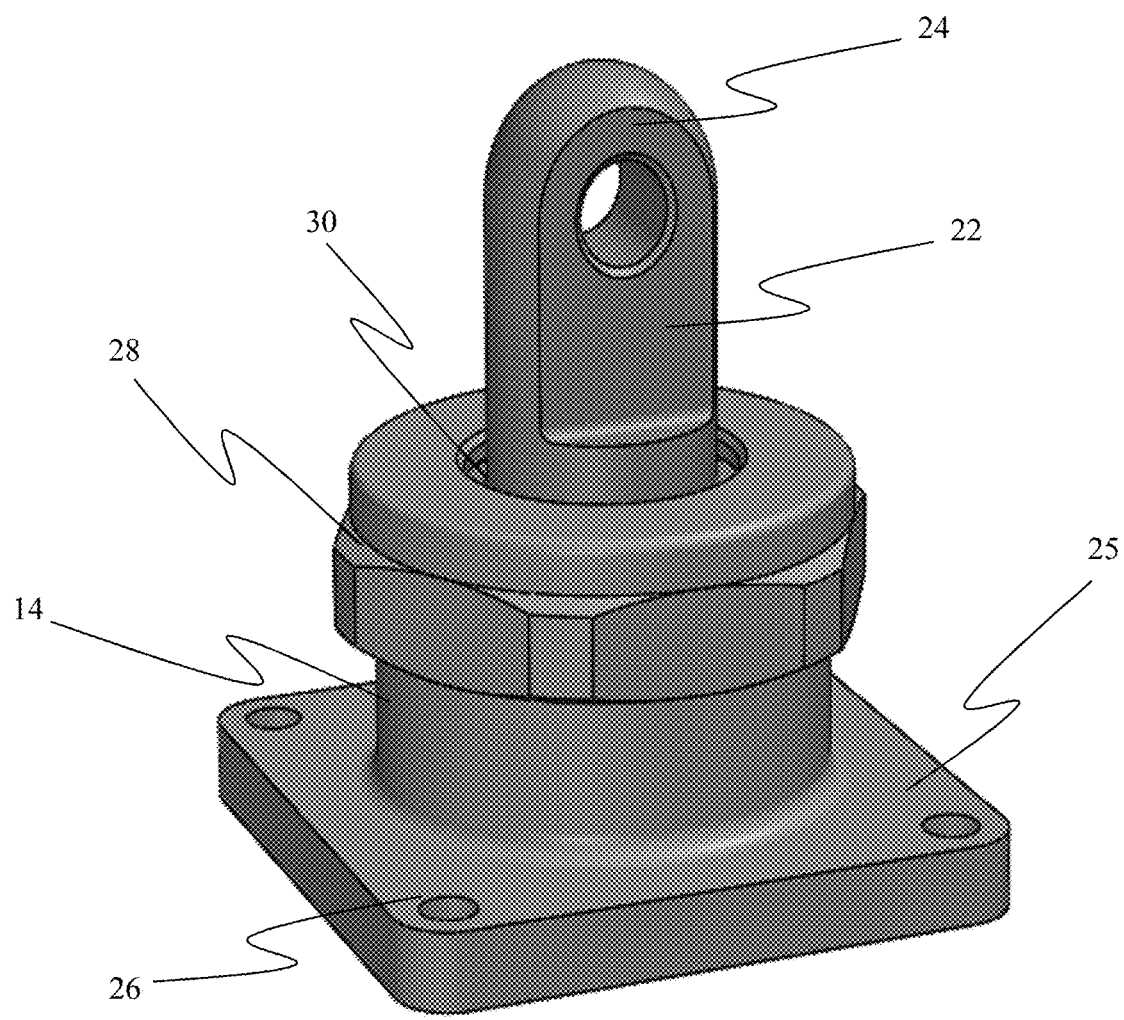
FIG. 1B is a schematic representation of an assembled one-piston spring device for shock absorption and/or isolation, in accordance with an embodiment.

Referring to FIG. 1B, in one embodiment, is an assembled one-piston spring device 10 for shock absorption and/or isolation. The device comprises a housing 14 with a base 25 and a lower mount system 26 configured to allow attachment of the device to another component or element of a system. The device further comprises a piston with a piston rod 22 and an upper mount 24 configured to allow attachment of the device to another component or element of a system. The device further comprises captive nut 28 with center cavity 30. Although not visible in FIG. 2, the closed loop spring 12 is positioned within the spring-guiding surface 16 of housing 14.

According to an embodiment, the spring loop profile may be circular, oval, rectangular, triangular, and/or a variety of other shapes and configurations. Similarly, the spring coil contour may be circular, oval, rectangular, and/or a variety of other shapes and configurations. The spring wire cross-section may be round, oval, rectangular, thin tape, and/or a variety of other shapes and configurations.

The spring 12 may be composed of any material capable of providing the necessary resistive force, and/or the necessary shock or vibration absorbing or isolation force. For example, the spring may be composed of a metal or metal alloy, a plastic, and/or any other compound suitable for the demands of device 10.

Figure 2:
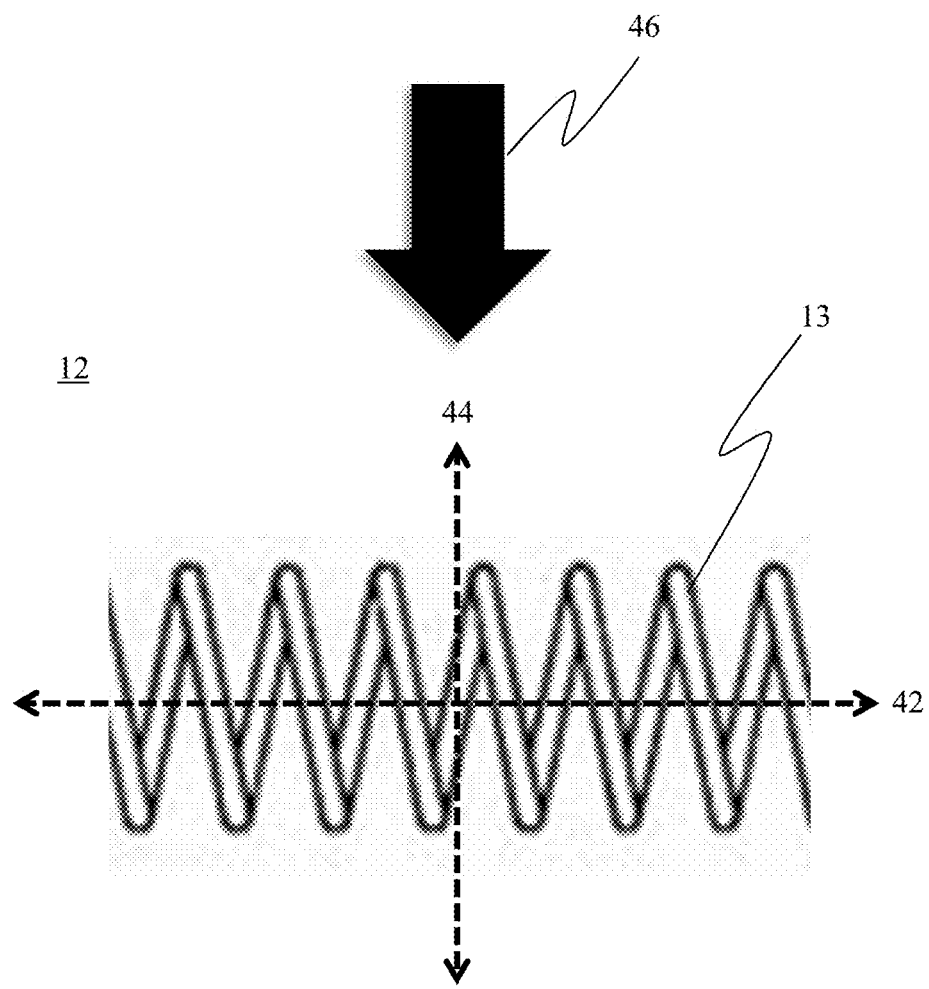
FIG. 2 is a schematic representation of a portion of a resilient element, in accordance with an embodiment.

Referring to FIG. 2, in one embodiment, is a side view of a portion of a canted coil spring 12, which normally forms a full circular ring as shown in other figures. The spring comprises a spring axis 42 which passes through the center point of each coil 13 of the coil spring, and a ring axis 44 in the center of the spring which is perpendicular to the spring axis 42. According to an embodiment, such as in FIG. 3 versus 4, spring 12 comprises in a direction perpendicular or roughly perpendicular to the ring axis 44 when a force 46 is applied to the piston 22. However, other configurations and embodiments are possible.

Figure 3:
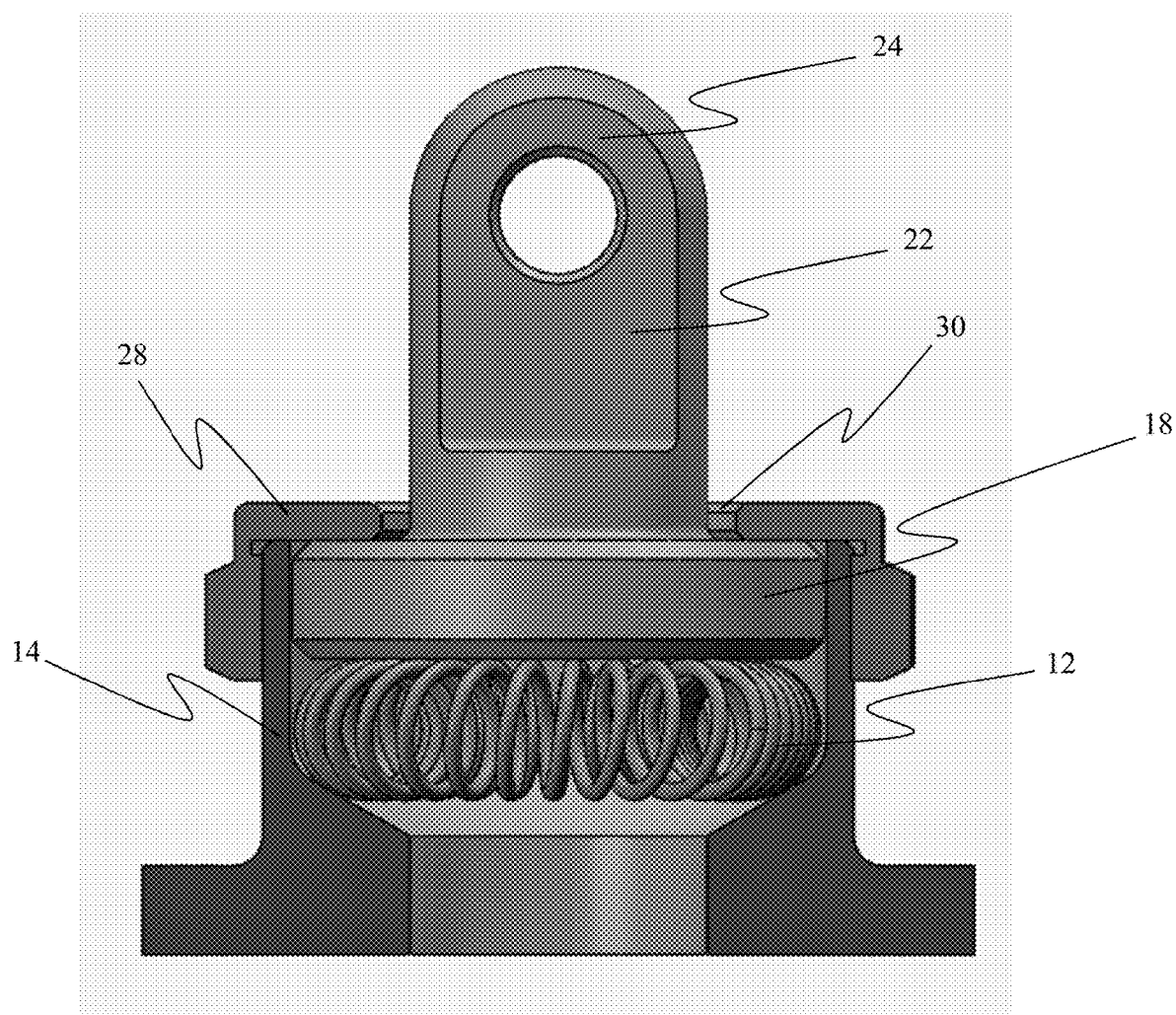
FIG. 3 is a cutaway view schematic representation of an assembled one-piston spring device in a relaxed state, in accordance with an embodiment.

Referring to FIG. 3 is a cutaway view of the assembled one-piston spring device 10 for shock absorption and/or isolation. The device is in a first relaxed state or configuration, meaning that no force is being applied to the piston and the spring 12 is in its natural position. The device comprises a housing 14, a piston with a piston rod 22, and an upper mount 24 configured to allow attachment of the device to another component or element of a system. The piston is held in place by captive nut 28 which comprises center cavity 30 through which the piston rod 22 passes. However, the captive nut 28 prevents the piston from being pulled out of the housing 12, or from being pushed out of the housing 12 by the bias of the spring.

Figure 4:
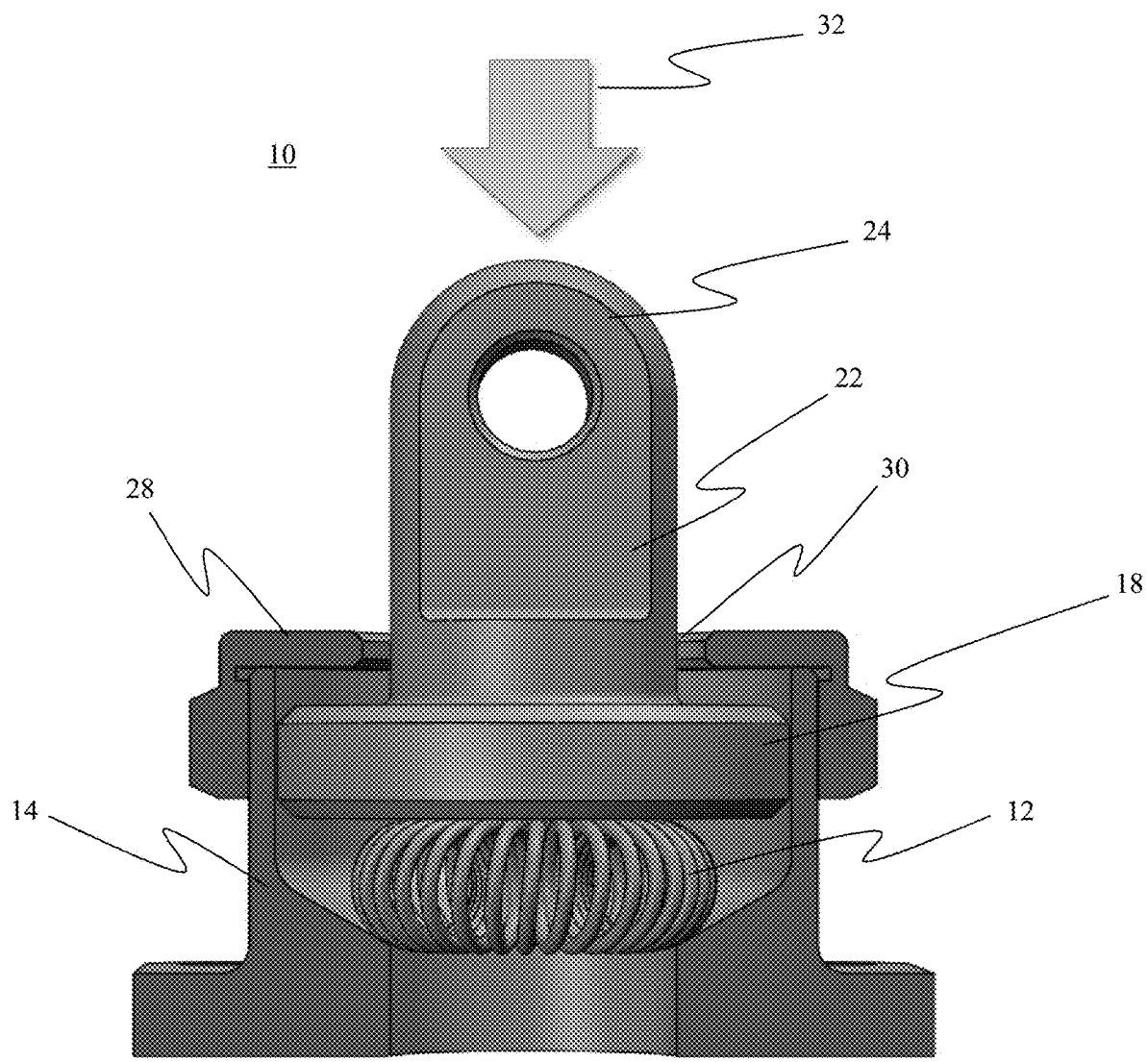
FIG. 4 is a cutaway view schematic representation of an assembled one-piston spring device in an impacted state, in accordance with an embodiment.

Referring to FIG. 4 is a cutaway view of the assembled one-piston spring device 10 for shock absorption and/or isolation. The device is in a second compressed state or configuration, meaning that a force 32 is being applied to the piston which has transferred the force to spring 12, and the spring is in a compressed state absorbing force 32. The device comprises a housing 14, a piston with a piston rod 22, and an upper mount 24 configured to allow attachment of the device to another component or element of a system. The piston is held in place by captive nut 28 which comprises center cavity 30 through which the piston rod 22 passes.

When an external shock load 32 is applied to the piston 22 it pushes the spring 12 down against inclined guiding loop surface 16, which in turn pushes the spring inward forcing it to compress thus absorbing external energy. Although compressed in FIG. 4, the spring will still be able to return to its natural position when external load is removed. Thus, the loop spring stores potential energy when it is impacted by force 32, and the length of the spring decreases. Similarly, the loop spring exerts kinetic energy when force 32 is released, and the length of the spring increases.

Figure 5A:
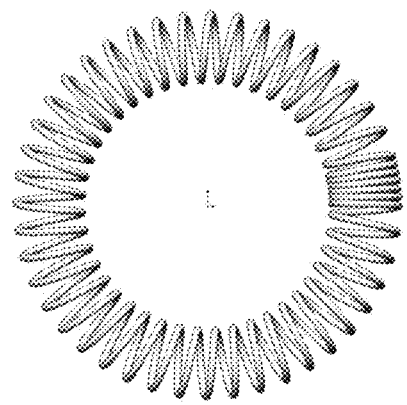
FIG. 5A is a schematic representation of a variation of a resilient element for a shock absorption and/or isolation, in accordance with an embodiment.
Figure 5B:
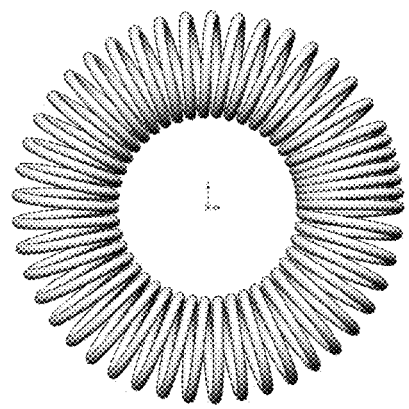
FIG. 5B is a schematic representation of a variation of a resilient element for a shock absorption and/or isolation, in accordance with an embodiment.
Figure 5C:
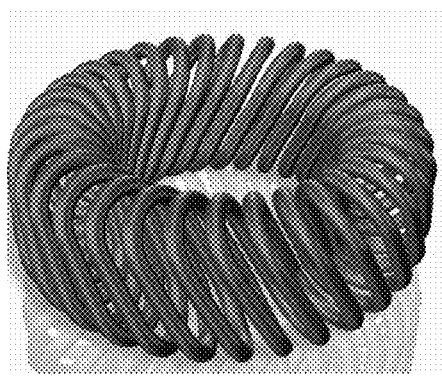
FIG. 5C is a schematic representation of a variation of a resilient element for a shock absorption and/or isolation, in accordance with an embodiment.
Figure 5D:
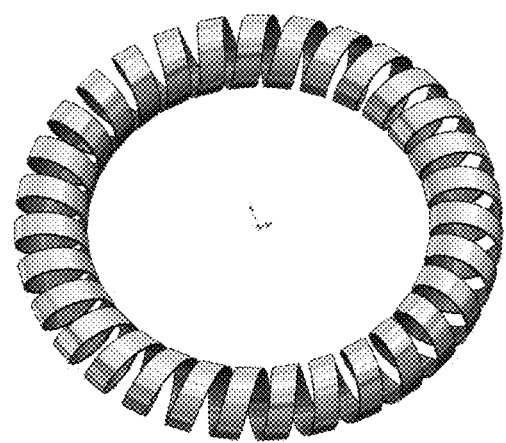
FIG. 5D is a schematic representation of a variation of a resilient element for a shock absorption and/or isolation, in accordance with an embodiment.
Figure 5E:
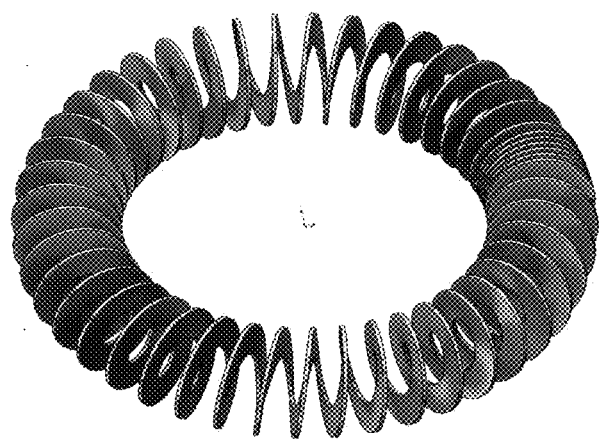
FIG. 5E is a schematic representation of a variation of a resilient element for a shock absorption and/or isolation, in accordance with an embodiment.

Referring to FIGS. 5A-5E, in accordance with an embodiment, are variations of the resilient element or spring 12. These are merely examples of possible spring 12 shapes or configurations, and are not limiting; additional shapes and configurations are possible. Referring to FIG. 5A, for example, is a compression garter spring. FIG. 5B is an example of an extension garter spring. FIG. 5C is an example of a canted spring. FIGS. 5D and 5E are further configurations of spring 12. According to an embodiment, the spring coil shape may be circular, oval, rectangular, and/or any other shape or configuration. The spring wire cross-section may be round, oval, rectangular, flat tape, and/or any other shape or configuration. The spring parameters may include a constant or variable pitch, constant or viable coil contour, and/or any other shape or configuration.

Figure 6A:
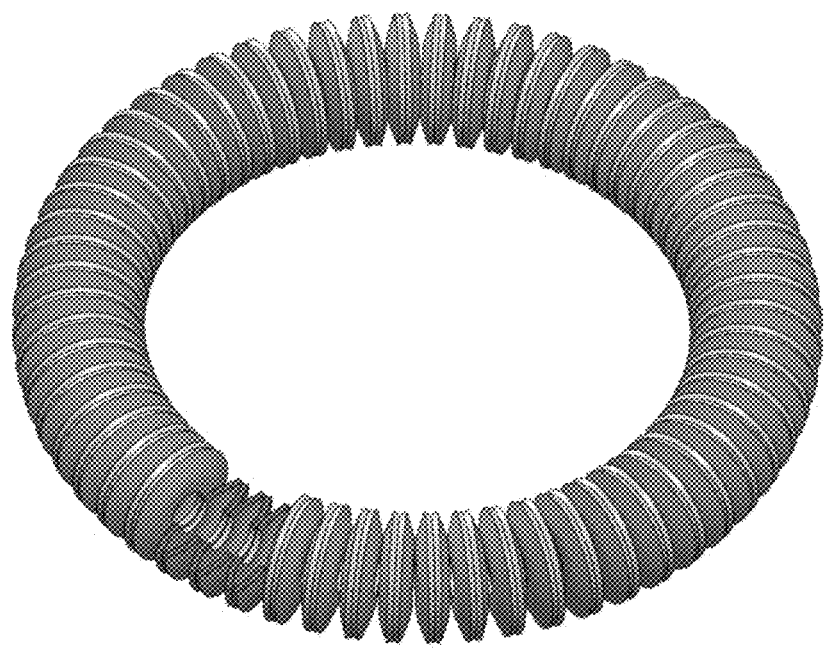
FIG. 6A is a schematic representation of a variation of a resilient element for a shock absorption and/or isolation, in accordance with an embodiment.
Figure 6B:
FIG. 6B is a schematic representation of a variation of a resilient element for a shock absorption and/or isolation, in accordance with an embodiment.
Figure 7:
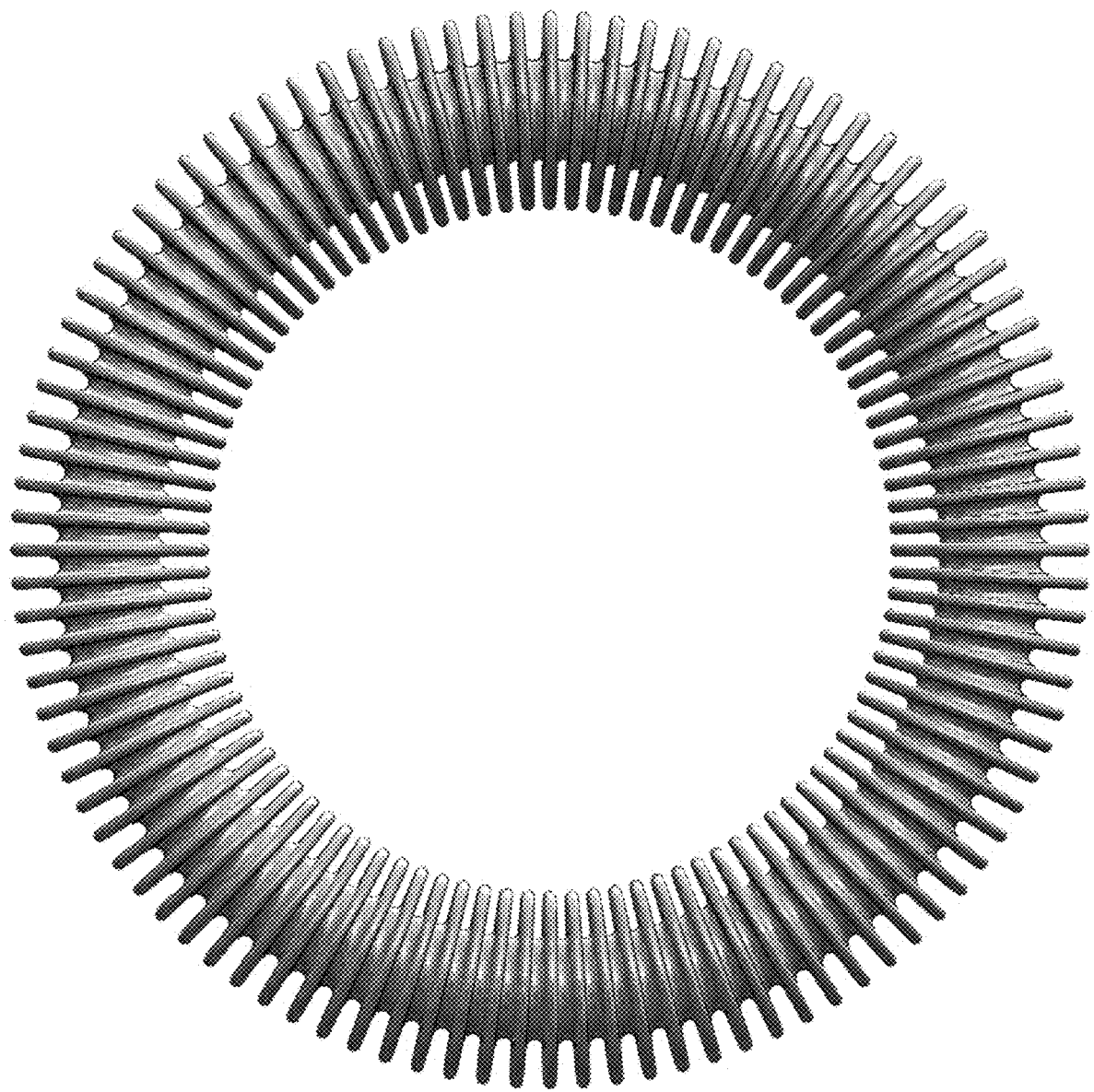
FIG. 7 is a schematic representation of a configuration comprising a bellow formed in a loop shape, in accordance with an embodiment.

Referring to FIGS. 6A and 6B, in accordance with an embodiment, are additional variations of the resilient element or spring 12. FIG. 6A, for example, comprises a loop arrangement such as for Belleville disk springs or similar structure. FIG. 6B comprises a loop arrangement such as a rigged and elastomeric disk combination. Many other configurations, combinations, and variations are possible. Referring to FIG. 7, in accordance with an embodiment, is another configuration comprising a bellow formed in a loop shape.

Figure 8A:
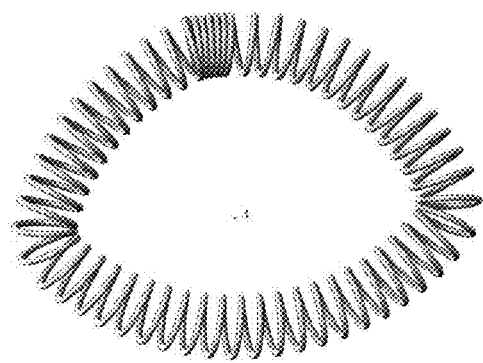
FIG. 8A is a schematic representation of a variation in a loop profile of a resilient element or spring, in accordance with an embodiment.
Figure 8B:
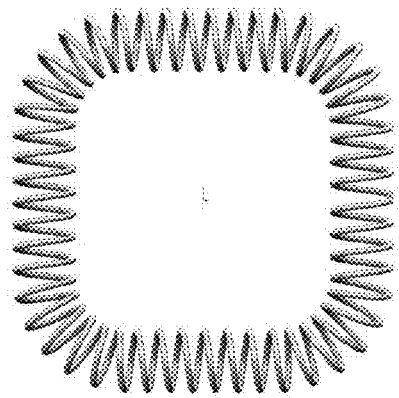
FIG. 8B is a schematic representation of a variation in a loop profile of a resilient element or spring, in accordance with an embodiment.
Figure 8C:
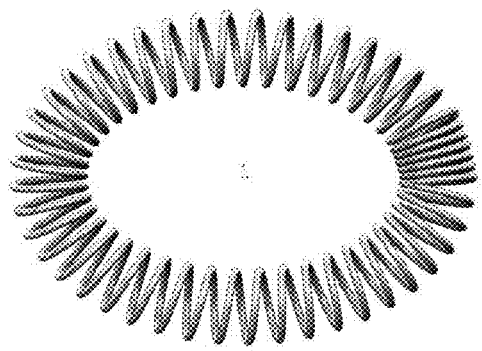
FIG. 8C is a schematic representation of a variation in a loop profile of a resilient element or spring, in accordance with an embodiment.

Referring to FIGS. 8A-8C, in accordance with an embodiment, are variations in the loop profile of the resilient element or spring 12. In addition to a conventional circular loop layout, the resilient loop element can be formed in various other shapes, such as depending on the shock absorber application requirements. FIG. 8A, for example, comprises a triangular loop profile, while FIG. 8B comprises a rectangular loop profile, and FIG. 8C comprises an oval loop profile. These and many other profile variations are possible, including combinations of loop profiles.

Figure 9:
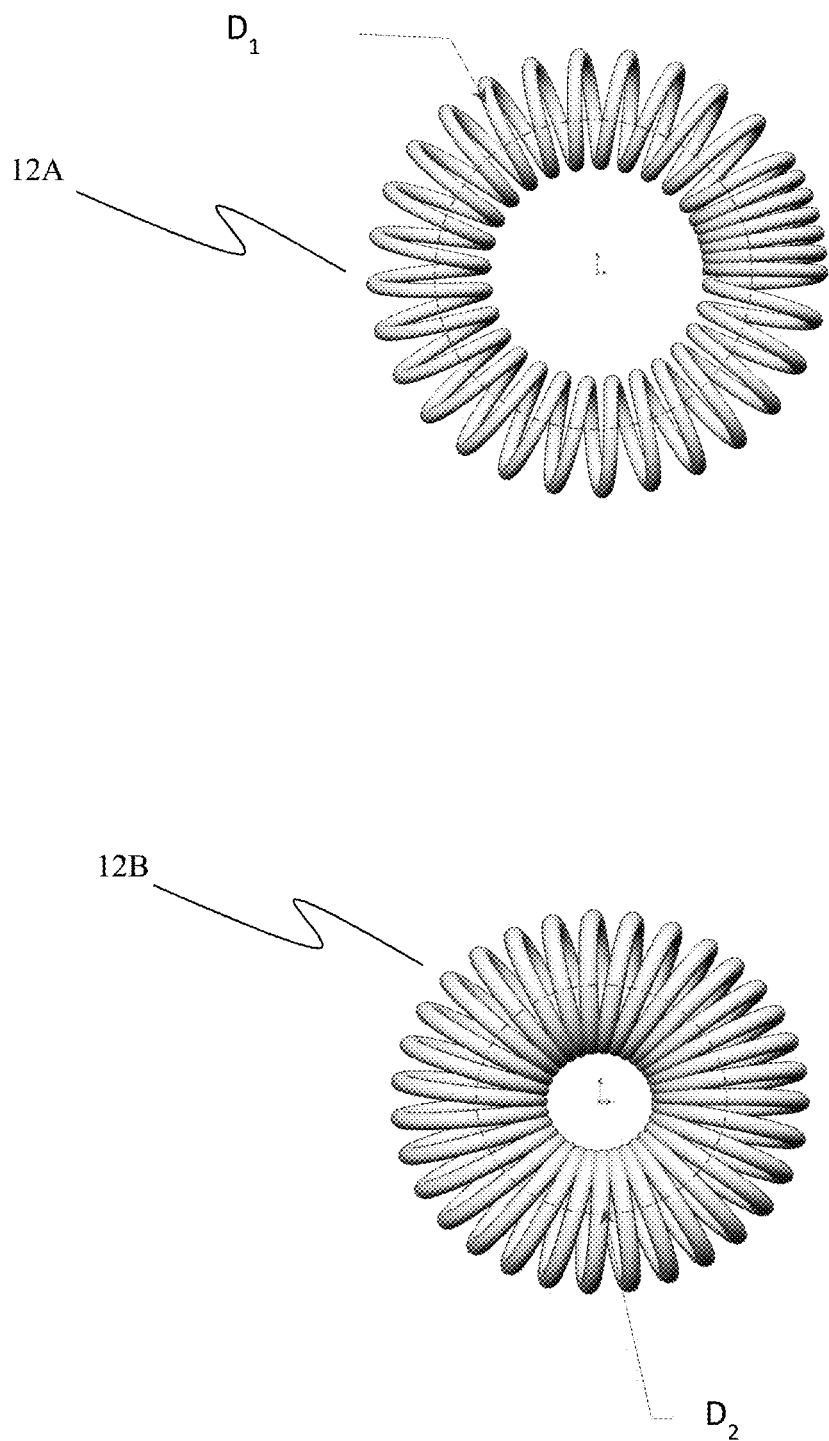
FIG. 9 is a schematic representation of a comparison of a relaxed and compressed coil spring, in accordance with an embodiment.
Figure 10:
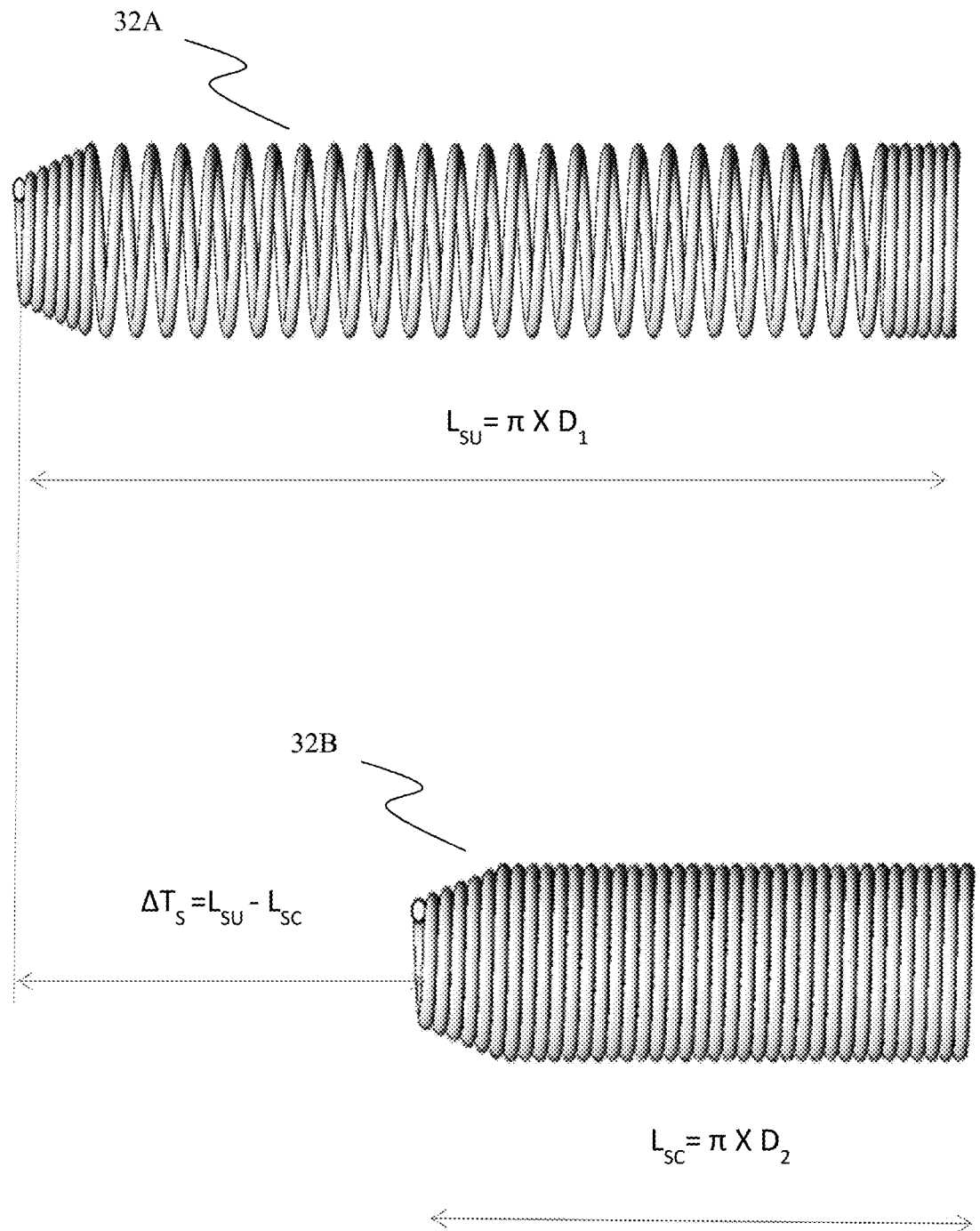
FIG. 10 is a schematic representation of a comparison of a relaxed and compressed prior art straight spring.
Figure 11:
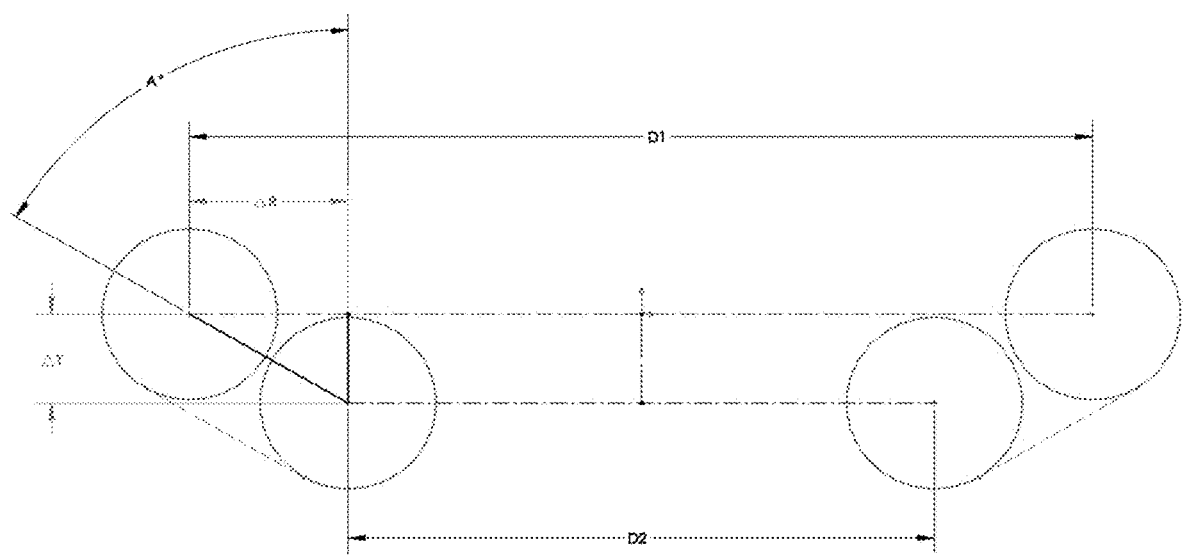
FIG. 11 is a schematic representation of the comparison of relaxed and compressed coil spring positions, in accordance with an embodiment.

The loop spring device comprises numerous advantages over the prior. For example, as shown in FIG. 9, loop spring 12A is in the first relaxed state or configuration, while loop spring 12B is in the second compressed state or configuration. Similarly, per the prior art, FIG. 10 comprises a straight spring 32A in a relaxed state or configuration, and the same spring 32B in a compressed state or configuration. FIG. 11 comprises a comparison of FIGS. 9 and 10. Assuming the following parameters:

$D_1$=Diameter of Loop Spring before load application (uncompressed);

$D_2$=Diameter of Loop Spring after load application (compressed);

$\Delta T$=Distance Loop Spring travels in the direction of force application; and $A°$=Angle of Spring Guiding Surface;

then:

$$D_2 = D_1 - \times \Delta T \times \tan A° \tag{Eq. 1}$$

$$\Delta T_S = \pi \times D_1 - \pi \times D_2 = \pi \times D_1 - \pi \times (D_1 - 2 \times \Delta T \times \tan A°) = \pi \times 2 \times \Delta T \times \tan A°, \tag{Eq. 2}$$

where $\Delta T_S$ is deflection of the equivalent straight spring in the direction of the external force application absorbing the same external energy as garter spring. Additionally:

$$R = \Delta T_S / \Delta T = \pi \times 2 \times \tan A° = 6.28 \times \tan A° \tag{Eq. 3}$$

where R is a ratio between distance isolated equipment travels in the case of a shock absorber with a straight spring layout vs. loop spring layout. For example, in a case when $A°=60°$, that ratio is $R \approx 11$. As a result the equipment speed, acceleration, and consequently applied shock load will decrease at the same ratio. A car or a train, for example, equipped with such type of suspension will experience significantly lower level of bouncing.

Figure 12:
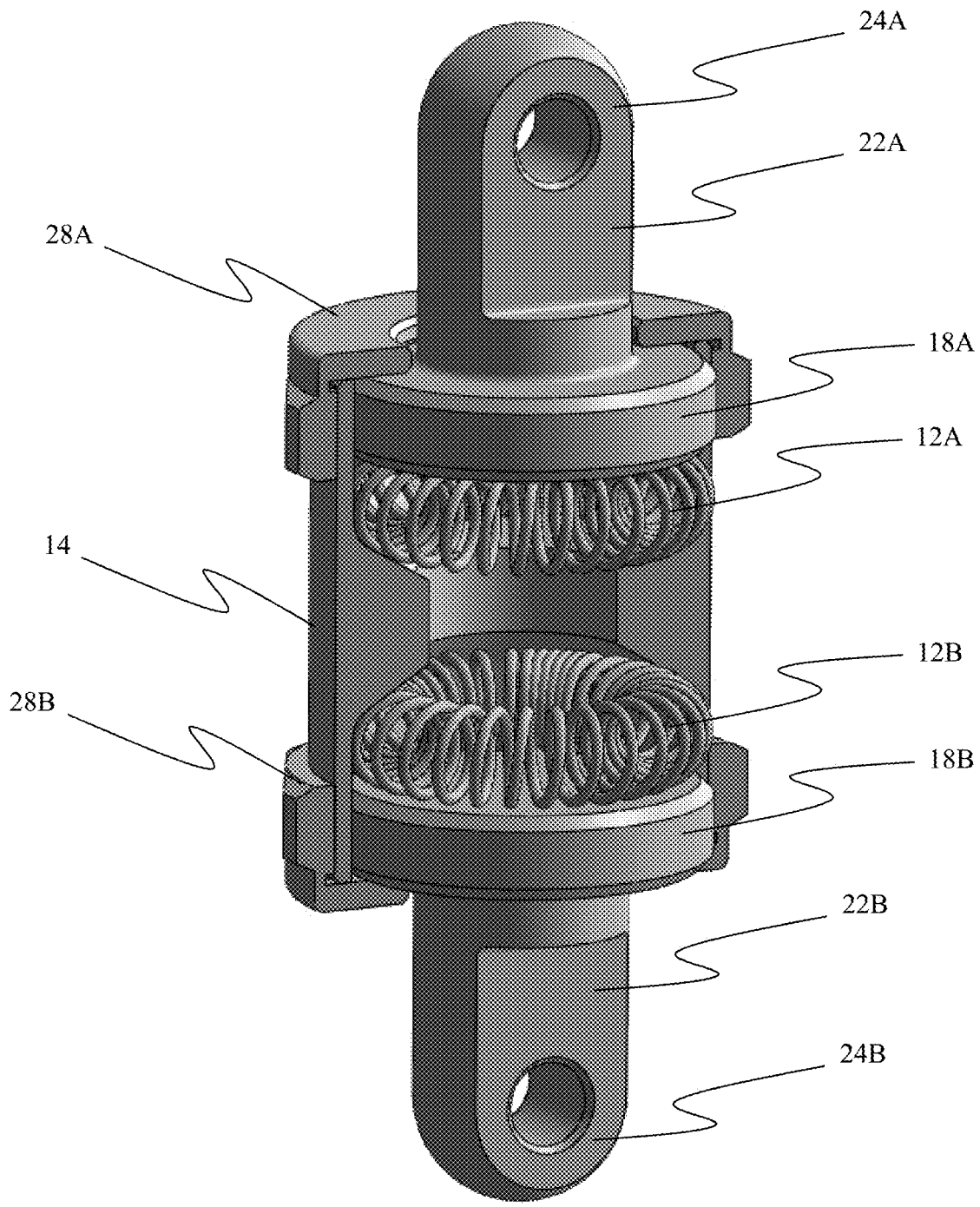
FIG. 12 is a schematic representation of an assembled two-piston spring device for shock absorption and/or isolation, in accordance with an embodiment.

Referring to FIG. 12, in one embodiment, is a cutaway view of a two-piston spring device 10 for shock absorption and/or isolation, in a relaxed or unimpacted state or configuration. The device 10 comprises a first closed loop spring 12A and a second closed loop spring 12B. Closed loop springs 12A, 12B are retained and positioned within a circular housing 14 comprising spring-guiding surfaces with a straight or curved profile. The closed loop springs 12A and 12B are each configured to receive a force from a piston. Accordingly, the device comprises a first piston 18A configured to engage and interact with spring 12A and a second piston 18B configured to engage and interact with spring 12B. Each piston 18A, 18B comprises a respective engagement surface configured to engage and interact with the respective spring 12A, 12B. Each piston 18A, 18B further comprises a piston rod 22A, 22B and a mount 24A, 24B configured to mount the rod to another component.

Each piston 18A, 18B receives a variable force via their respective mount 24A, 24B which causes the respective piston rod 22A, 22B to move within the housing 14 against the spring to apply a force to the respective spring 12A, 12B. When the force is absent or removed, the piston rod is allowed to move within the housing 14 away from the spring. Each piston is held in place by a captive nut 28, which comprises a center cavity 30 formed there through via which the piston rod can move up or down depending on the variable force imposed on the piston.

Spring 12A and spring 12B may have identical or individual spring parameters such as wire diameter, pitch, outside diameter, free length, and material, among many other parameters, in order to achieve desired damping characteristics of the shock absorber.

Figure 13:
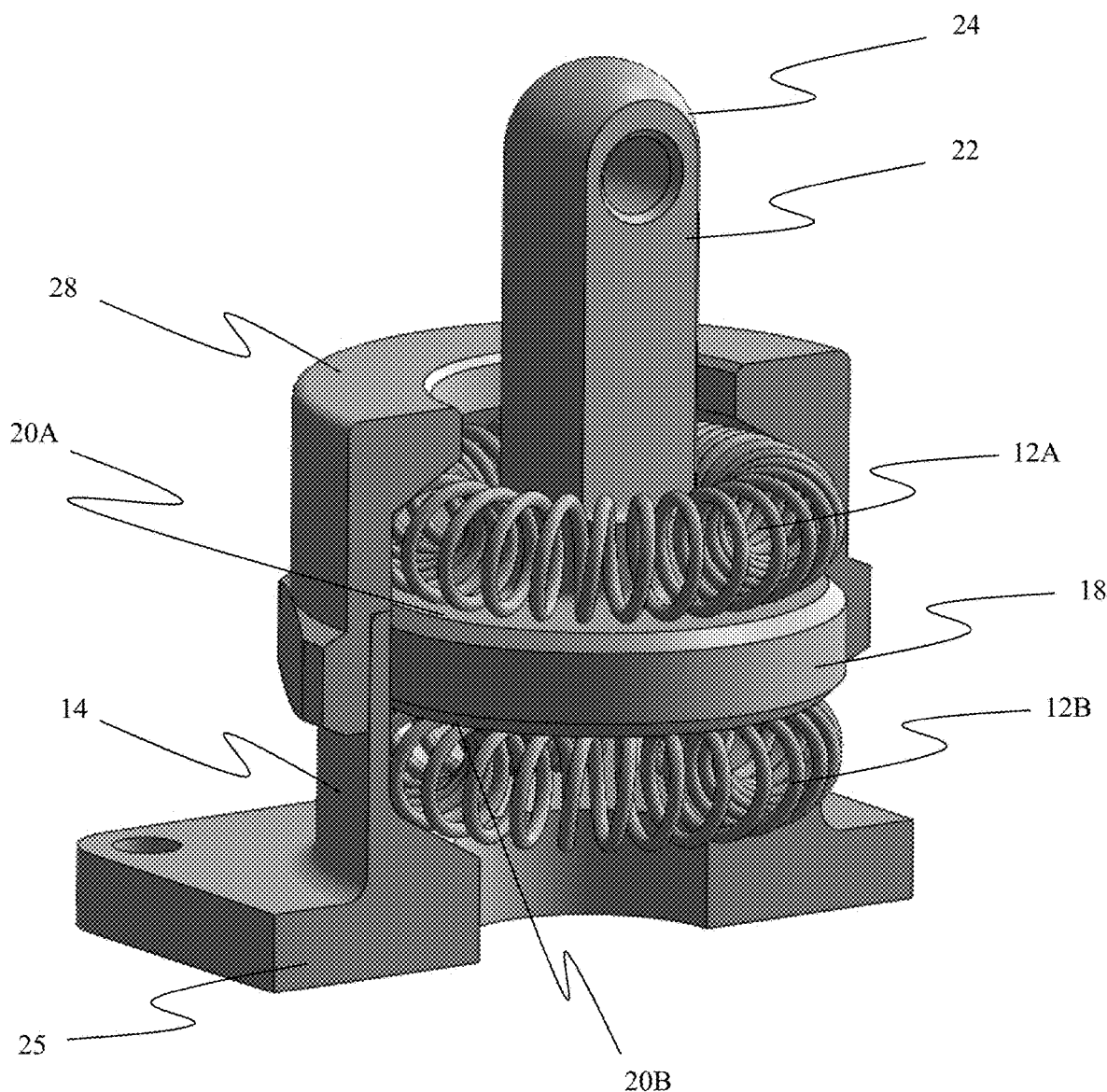
FIG. 13 is a schematic representation of an assembled one-piston dual-spring device for shock absorption and/or isolation, in accordance with an embodiment.

Referring to FIG. 13, in one embodiment, is a cutaway view of a one-piston dual spring device 10 for shock absorption and/or isolation, in a relaxed or unimpacted state or configuration. The device 10 comprises a first closed loop spring 12A and a second closed loop spring 12B. Closed loop springs 12A, 12B are retained and positioned within a circular housing 14 comprising spring-guiding surfaces with a straight or curved profile. The closed loop springs 12A and 12B are each configured to receive a force from a single piston 18. Piston 18 is positioned between springs 12A and 12B and thus comprises two surfaces 20A and 20B each configured to engage and interact with a different one of the springs. Piston 18 further comprises a piston rod 22A and a mount 24 configured to mount the rod to another component. The device comprises a captive nut 28, which comprises a center cavity formed there through via which the piston rod can move up or down depending on the variable force imposed on the piston.

In this embodiment, the piston is configured to receive a downward force (toward the base 25) and/or an upward force (away from base 25). When the piston receives a downward force, the force is transferred to spring 12B, thereby impacting spring 12B. When the piston receives an upward force, the force is transferred to spring 12A, thereby impacting spring 12A.

Figure 14A:
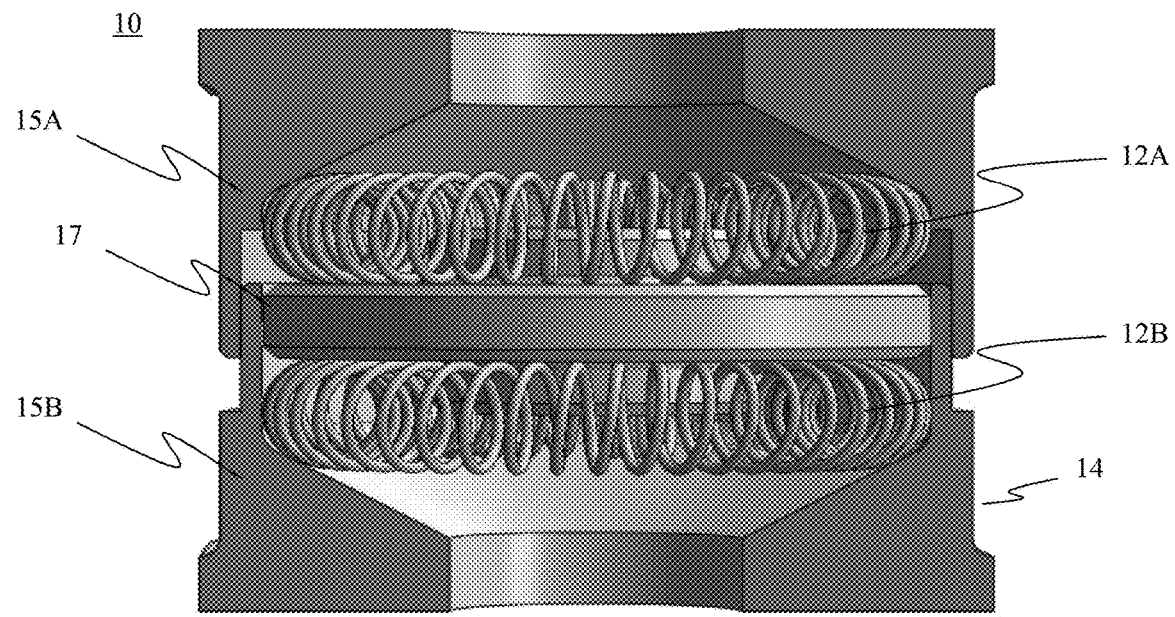
FIG. 14A is a schematic representation of an assembled one-piston dual-spring device for shock absorption and/or isolation, in accordance with an embodiment.
Figure 14B:
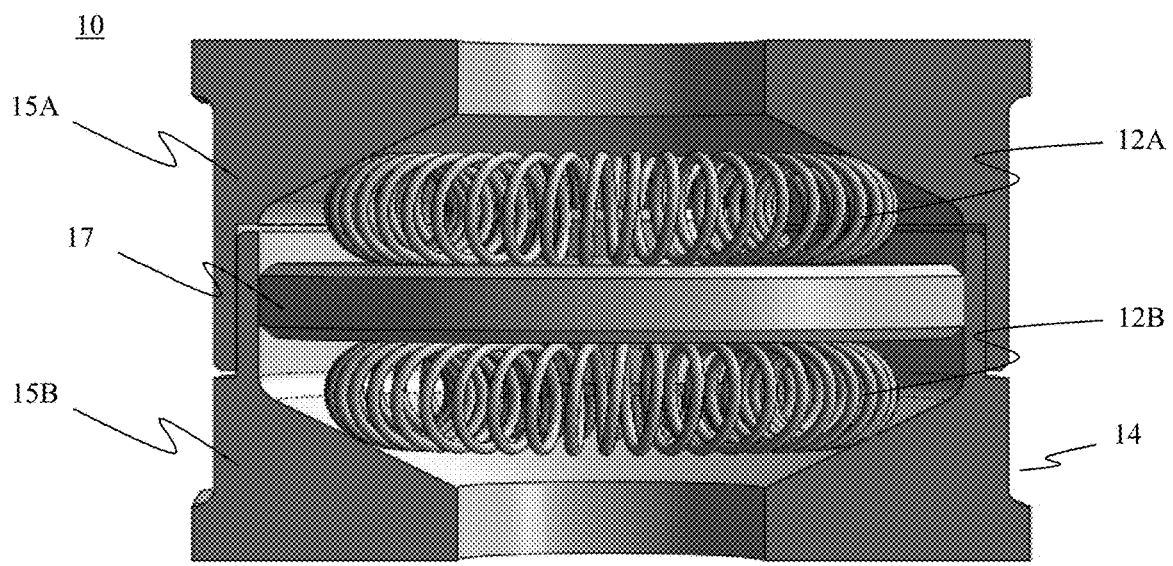
FIG. 14B is a schematic representation of an assembled one-piston dual-spring device for shock absorption and/or isolation, in accordance with an embodiment.

Referring to FIGS. 14A and 14B, in accordance with various embodiments, are cutaway views of a one-piston two-spring device 10 for shock absorption and/or isolation, in a relaxed or unimpacted state or configuration (FIG. 14A) and an impacted state or configuration (FIG. 14B). The device 10 comprises two springs 12A and 12B which are retained and positioned within a housing 14 comprising spring-guiding surfaces with a straight or curved profile. The springs 12A and 12B are each configured to receive a force from at least a portion of the housing 14, and specifically from the spring-guiding surfaces of the housing.

According to the embodiment, the housing 14 comprises a first spring-guiding body 15A and a second spring-guiding body 15B, where one or both of the two spring-guiding bodies can move relative to the other in response to application or removal of a force. For example, in FIG. 14A, there is no force applied to the housing and thus the two spring-guiding bodies are in a relaxed state and the spring-guiding surfaces of the spring-guiding bodies are not applying a force and the springs are in the relaxed or unimpacted state or configuration. In FIG. 14B, a force is being applied to one or both of the two spring-guiding bodies, and thus the spring-guiding surfaces of the spring-guiding bodies are applying a force to the spring and the springs are in the impacted state or configuration.

According to an embodiment, the housing further comprises an internal element 17 positioned between the first and second springs, the internal component comprising a first spring-engagement surface configured to interact with the first spring and a second spring-engagement surface configured to interact with the second spring. The internal element 17 is optionally affixed to one or both of the spring-guiding bodies.

Figure 15:
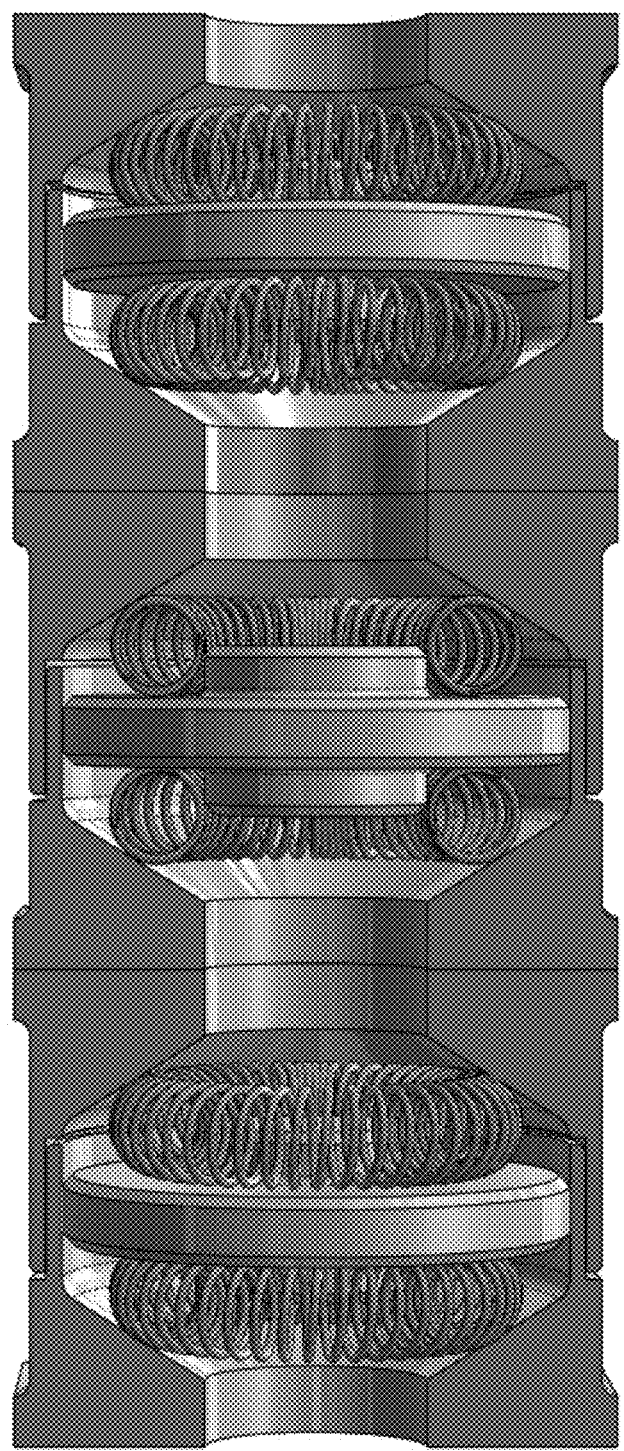
FIG. 15 is a schematic representation of a shock absorption and/or isolation device comprising a multi-spring configuration, in accordance with an embodiment.

Referring to FIG. 15, in one embodiment, is a device 10 for shock absorption and/or isolation, comprising a multi-spring configuration. Although depicted utilizing several components of device 10 shown in FIGS. 14A and 14B, the device may comprise any of the variations described or otherwise envisioned herein. The device in FIG. 15 is in an impacted state or configuration, and comprises three different elements (34A, 34B, and 34C).

Figure 16:
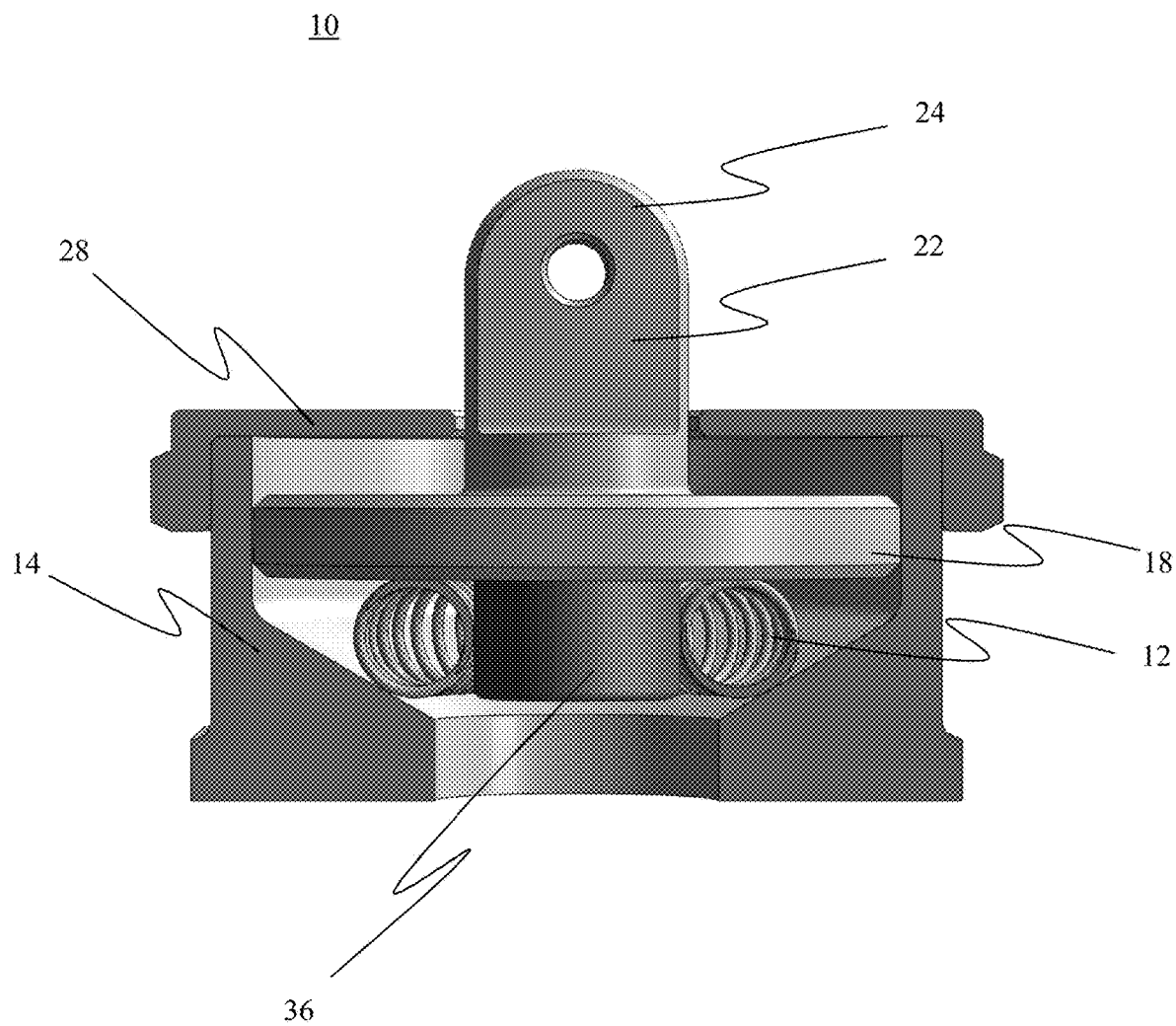
FIG. 16 is a schematic representation of a shock absorption and/or isolation device with a damping element, in accordance with an embodiment.

Referring to FIG. 16, in accordance with an embodiment, is a cutaway view of a device 10 for shock absorption and/or isolation, in an impacted state or configuration. The device 10 comprises a spring 18 which is retained and positioned within a housing 14 comprising spring-guiding surfaces. The closed loop spring 12 is configured to receive a force from a piston. Accordingly, the device comprises a piston 18 configured to engage and interact with spring 12. Piston 18 comprises an engagement surface configured to engage and interact with the spring 12. Piston 18 further comprises a piston rod 22 and a mount 24 configured to mount the rod to another component.

The device further comprises a damping element 36, which may be, for example, an elastomeric damping element among other possible damping elements. When the spring is impacted by an external shock load it "squeezes" the damper, thus dissipating more energy in it, and hence achieving additional damping effect. While the damping element 36 may be positioned as depicted in FIG. 16, this example is not limiting and the damping element 36 may be positioned or configured in any way such that the damping element is able to absorb energy as described or otherwise envisioned herein.

Figure 17:
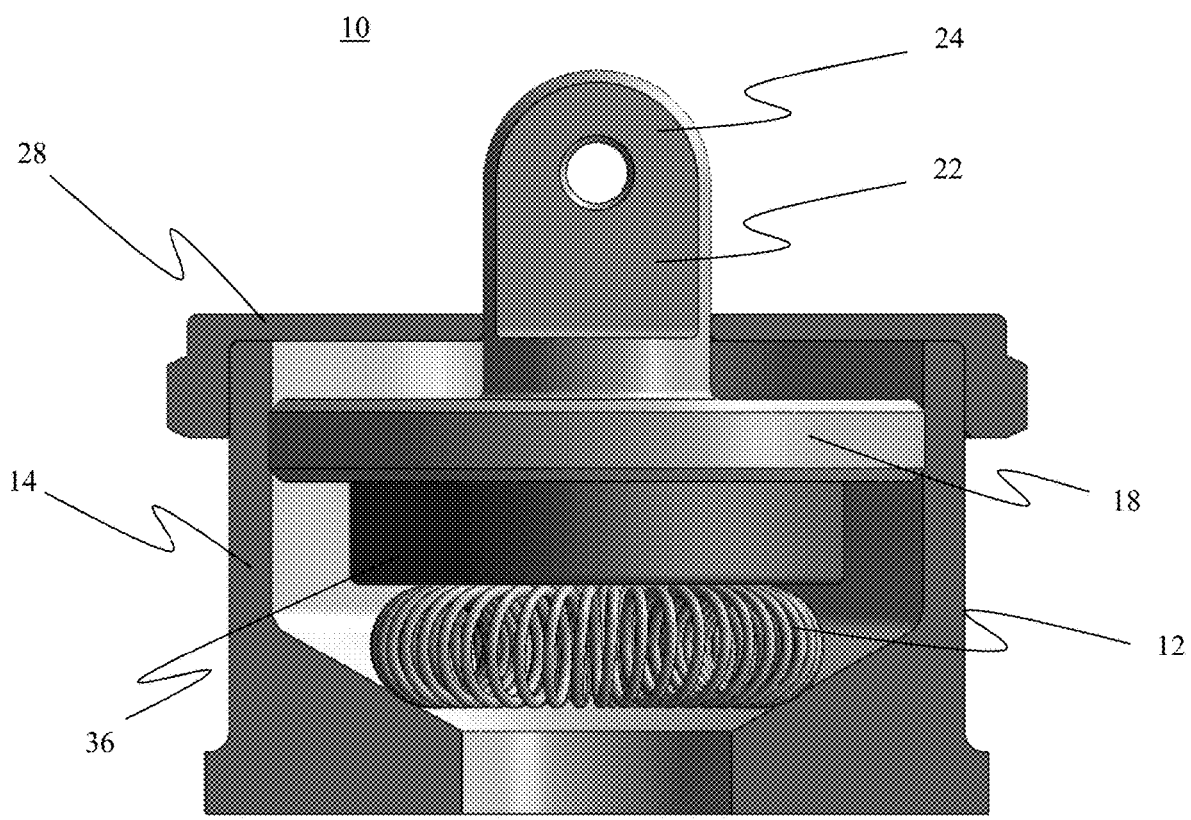
FIG. 17 is a schematic representation of a shock absorption and/or isolation device with a damping element, in accordance with an embodiment.

Referring to FIG. 17, in accordance with an embodiment, is a cutaway view of a device 10 for shock/vibration absorption and/or isolation. This embodiment is similar to the embodiment depicted in FIG. 16, as the device comprises a damping element 36, which may be, for example, an elastomeric damping element among other possible damping elements. In this embodiment, the damping element is positioned such that it received force from the piston 18 and transfers the energy to the spring 12. This may be utilized, for example, for vibration control.

Figure 18:
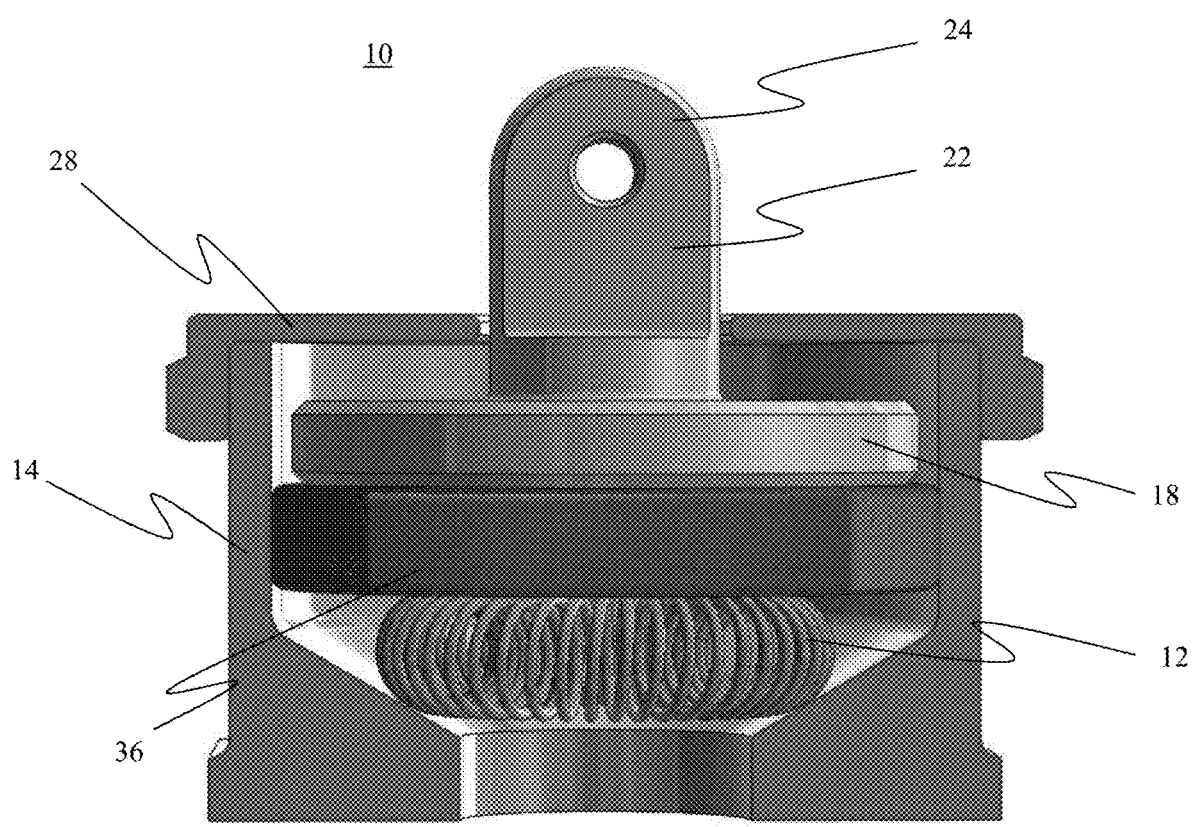
FIG. 18 is a schematic representation of a shock absorption and/or isolation device with a damping element, in accordance with an embodiment.

Referring to FIG. 18, in accordance with an embodiment, is a cutaway view of a device 10 for shock/vibration absorption and/or isolation. This embodiment is similar to the embodiment depicted in FIGS. 16 and 17, as the device comprises a damping element 36, which may be, for example, an elastomeric damping element among other possible damping elements. In this embodiment, the damping element is positioned such that it received force from the piston 18 and transfers the energy to the spring 12. This may be utilized, for example, for vibration control. In contrast to the embodiment depicted in FIG. 17, the damping element is in contact with the inner side walls of the housing 14, while there is a clearance between the piston 18 and the inner side walls of the housing 14. In this configuration, the shock mount can control or dampen vibrations both vertically and horizontally.

Figure 19A:
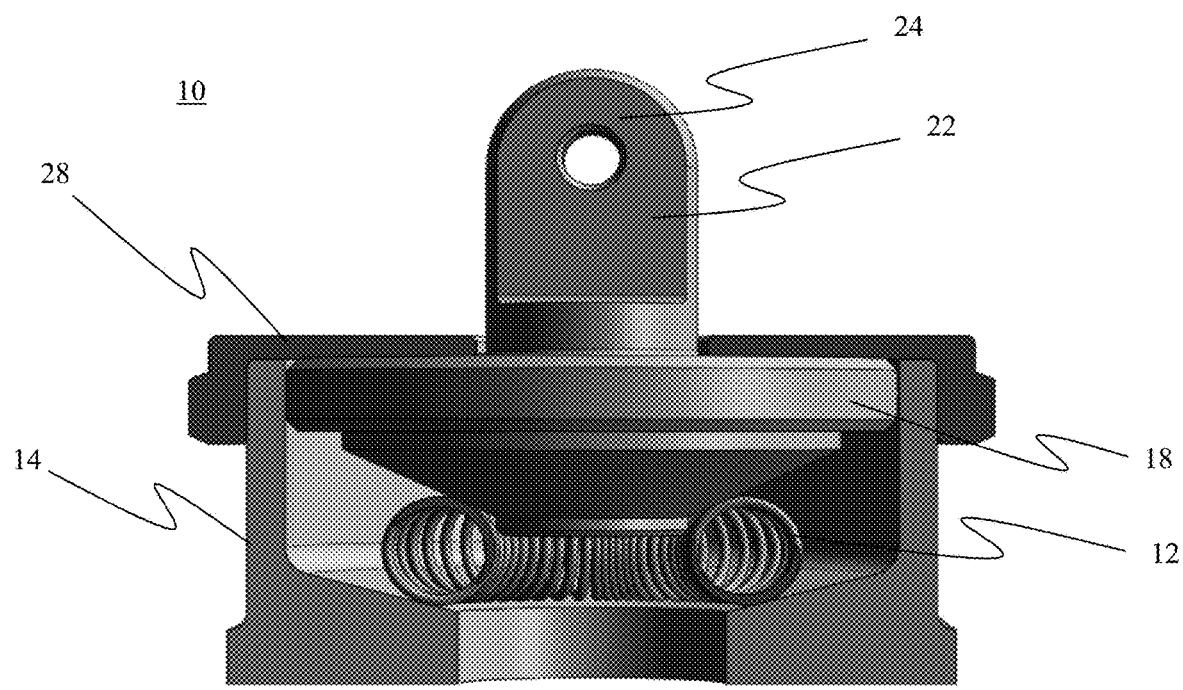
FIG. 19A is a schematic representation of a shock absorption and/or isolation device, in accordance with an embodiment.
Figure 19B:
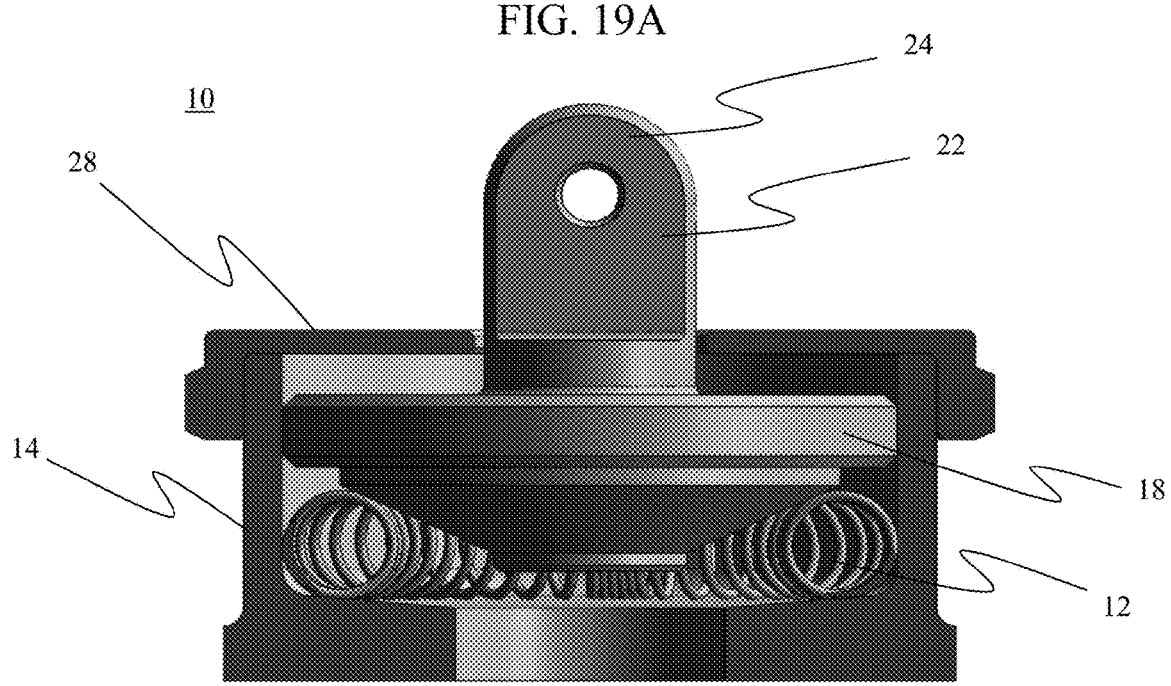
FIG. 19B is a schematic representation of a shock absorption and/or isolation device, in accordance with an embodiment.

Referring to FIGS. 19A and 19B, in accordance with another embodiment, are cutaway views of a device 10 for shock/vibration absorption and/or isolation, in a first relaxed state or configuration (FIG. 19A) and a second impacted state or configuration (FIG. 19B). In this embodiment, a portion of piston 18 is conical in shape. When an external shock load is applied to piston 18, the conical surface of the piston pushes on the spring 12, which in turn pushes the spring outward to the impacted configuration, forcing it to absorb external energy. When the force is relaxed the spring is able to return to the first relaxed state or configuration. Thus, the extension loop spring 12 stores potential energy when the spring is impacted—when the length of the spring increases—and exerts kinetic energy when the force is released and the length of the spring decreases.

As with any other embodiment described or envisioned herein, the embodiment depicted in FIGS. 19A and 19B can comprise multiple devices 10 or springs 12, can utilize various other spring shapes or sizes, and can include one or more damping elements, among other modifications.

In addition to the coil spring shock/vibration absorption devices described or otherwise envisioned herein, the coil spring shock/vibration absorption device, system, and method described or otherwise envisioned herein can be utilized for any system requiring shock or vibration absorption or dampening. For example, the system may be utilized in bicycle saddles, car seats, chairs, industrial and commercial devices and systems, building foundations, car shocks, shoes or other wearable devices, and any other device or system. Although other examples of systems using the coil spring shock/vibration absorption device are described herein, these examples are not intended to be limiting and any other device or system may utilize the coil spring shock/vibration absorption system or method.

Figure 20A:
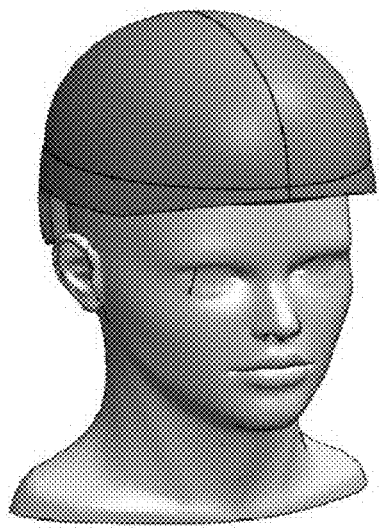
FIG. 20A is a schematic representation of a helmet system utilizing a coil spring shock/vibration absorption method, in accordance with an embodiment.
Figure 20B:
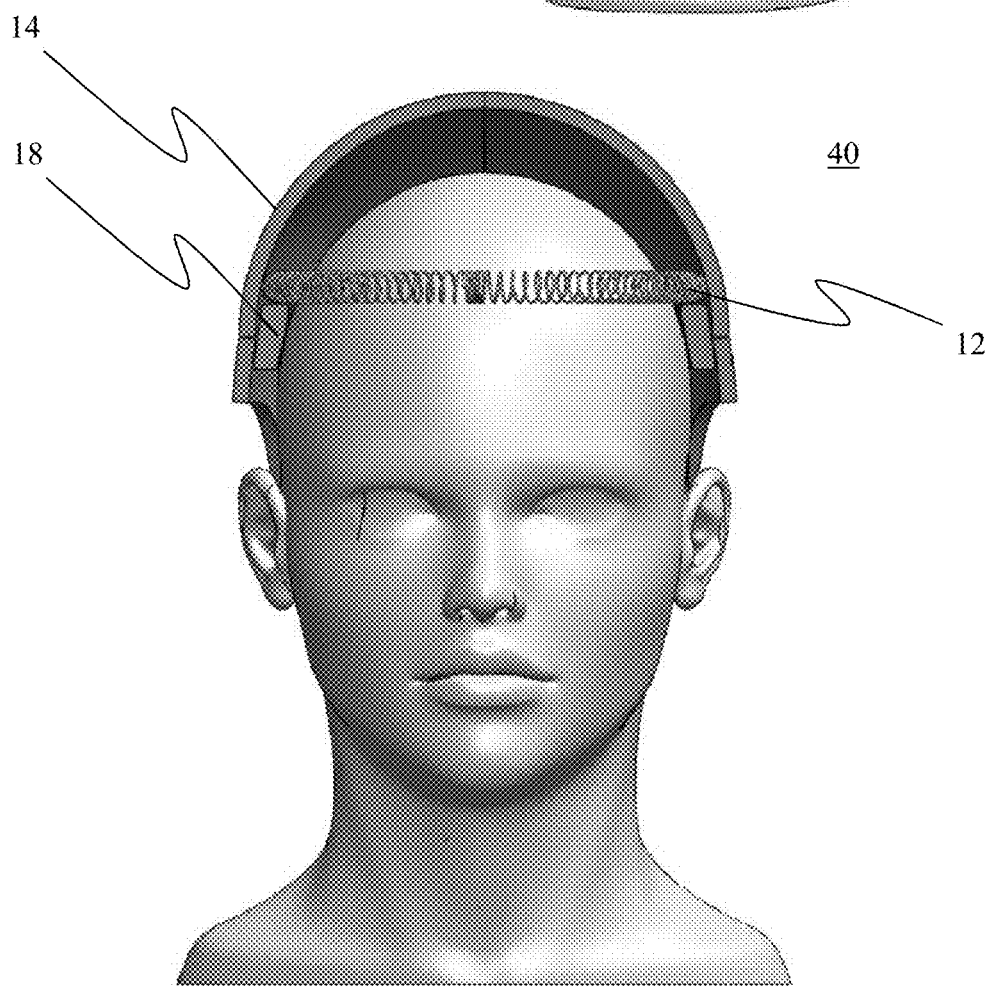
FIG. 20B is a schematic representation of a helmet system utilizing a coil spring shock/vibration absorption method, in accordance with an embodiment.

Referring to FIGS. 20A and 20B, in accordance with an embodiment, is a helmet system 40 utilizing the coil spring shock/vibration absorption method. As shown in FIG. 20B, helmet 40 comprises a shell or housing 14, a coil spring 12, and a piston 18. When a force is applied to the helmet, such as a shock where the driver/rider is thrown or falls and hits the helmet against a surface, the force pushes on the housing 14 and forces it against the helmet suspension 18 which functions as a piston. This impacts the coil spring 12, which absorbs the force or shock rather than the head and skull. Many other configurations are possible.

While embodiments of the present invention has been particularly shown and described with reference to certain exemplary embodiments, it will be understood by one skilled in the art that various changes in detail may be effected therein without departing from the spirit and scope of the invention as defined by claims that can be supported by the written description and drawings. Further, where exemplary embodiments are described with reference to a certain number of elements it will be understood that the exemplary embodiments can be practiced utilizing either less than or more than the certain number of elements.

What is claimed is:

1. A shock or vibration absorption device, comprising:
 a housing comprising a spring-guiding surface, wherein the spring-guiding surface is slanted;
 a piston positioned within the housing and comprising a spring-engagement surface, wherein the piston is configured to move relative to the housing in response to an applied force; and
 a closed-loop resilient element positioned between the spring-engagement surface of the piston and the spring-guiding surface of the housing such that a ring axis of the resilient element is substantially parallel to a direction of the applied force;
 wherein the closed-loop resilient element is configured to absorb kinetic energy as the piston moves relative to the housing in response to the applied force, and further wherein the closed-loop resilient element comprises a plurality of coils.

2. The shock or vibration absorption device of claim 1, further comprising a dampening element.

3. The shock or vibration absorption device of claim 2, wherein the dampening element is an elastomeric dampening element.

4. The shock or vibration absorption device of claim 1, further comprising:
 a second spring-guiding surface within the housing;
 a second piston configured to move relative to the housing in response to a second applied force, and comprising a second piston spring-engagement surface; and
 a second closed-loop resilient element, the second resilient element positioned between the second piston spring-engagement surface and the second spring-guiding surface.

5. The shock or vibration absorption device of claim 4, wherein the applied force and the second applied force are substantially opposing forces.

6. The shock or vibration absorption device of claim 1, further comprising:
 a second spring-guiding surface within the housing;
 a second closed-loop resilient element; and
 a second piston spring-engagement surface of the piston;
 wherein the second resilient element is positioned between the second spring-guiding surface of the housing and the second piston spring-engagement surface of the piston.

7. The shock or vibration absorption device of claim 6, wherein the first and second spring-engagement surfaces are positioned on opposite sides of the piston.

8. The shock or vibration absorption device of claim 1, wherein the piston is fixed and the housing is configured to move relative to the piston in response to the applied force.

9. The shock or vibration absorption device of claim 1, wherein the housing is fixed and the piston is configured to move relative to the piston in response to the applied force.

10. The shock or vibration absorption device of claim 1, wherein the spring-engagement surface of the piston is curved or angled.

11. The shock or vibration absorption device of claim 1, wherein the housing comprises a mount configured to mount the device in a fixed position.

12. The shock or vibration absorption device of claim 1, wherein the piston comprises a mount.

13. The shock or vibration absorption device of claim 1, further comprising a captive nut comprising a center cavity formed therethrough via which the piston rod can move in response to the applied force.

14. A shock or vibration absorption device, comprising:
 a housing comprising a first spring-guiding body with a first spring-guiding surface and a second spring-guiding body with a second spring-guiding surface, wherein at least one of the first and second spring-guiding body is configured to move relative to the other spring-guiding body in response to an applied force;
 a first closed-loop resilient element positioned relative to the first spring-guiding surface that a ring axis of the first resilient element is substantially parallel to a direction of the applied force, wherein the first closed-loop resilient element comprises a plurality of coils; and
 a second closed-loop resilient element positioned relative to the second spring-guiding surface that a ring axis of the second resilient element is substantially parallel to a direction of the applied force, wherein the second closed-loop resilient element comprises a plurality of coils;
 wherein each of the first and second resilient element is configured to absorb kinetic energy as the at least one of the first and second spring-guiding bodies moves relative to the other spring-guiding body in response to an applied force.

15. The shock or vibration absorption device of claim 14, further comprising an internal component positioned between the first and second resilient element, the internal component comprising a first spring-engagement surface configured to interact with the first resilient element and a second spring-engagement surface configured to interact with the second resilient element.

16. The shock or vibration absorption device of claim 15, wherein the dampening element is an elastomeric dampening element.

17. The shock or vibration absorption device of claim 14, further comprising a dampening element.

18. A helmet device, comprising:
   a housing comprising a spring-guiding surface;
   a piston positioned within the housing and comprising a spring-engagement surface; and
   a closed-loop resilient element positioned between the spring-engagement surface of the piston and the spring-guiding surface of the housing such that a ring axis of the resilient element is substantially parallel to a direction of the applied force;
   wherein the resilient element is configured to absorb kinetic energy in response to the applied force, and further wherein the closed-loop resilient element comprises a plurality of coils.

* * * * *